United States Patent
Nagare et al.

(10) Patent No.: US 11,017,507 B2
(45) Date of Patent: May 25, 2021

(54) IMAGE PROCESSING DEVICE FOR DETECTION AND CORRECTION OF CLOUD COVER, IMAGE PROCESSING METHOD AND STORAGE MEDIUM

(71) Applicant: NEC Corporation, Tokyo (JP)

(72) Inventors: Madhuri Mahendra Nagare, Tokyo (JP); Eiji Kaneko, Tokyo (JP); Hirofumi Aoki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 47 days.

(21) Appl. No.: 16/467,146

(22) PCT Filed: Dec. 20, 2016

(86) PCT No.: PCT/JP2016/087862
§ 371 (c)(1),
(2) Date: Jun. 6, 2019

(87) PCT Pub. No.: WO2018/116367
PCT Pub. Date: Jun. 28, 2018

(65) Prior Publication Data
US 2020/0065946 A1  Feb. 27, 2020

(51) Int. Cl.
*G06K 9/34*  (2006.01)
*G06T 5/00*  (2006.01)
(Continued)

(52) U.S. Cl.
CPC ........... *G06T 5/005* (2013.01); *G06K 9/38* (2013.01); *G06T 5/40* (2013.01); *G06T 2207/10036* (2013.01); *G06T 2207/30192* (2013.01)

(58) Field of Classification Search
CPC ... G06K 9/38; G06T 5/40; G06T 2207/10036; G06T 2207/30192; G06T 5/005
(Continued)

(56) References Cited

U.S. PATENT DOCUMENTS

| 9,721,181 | B2 * | 8/2017 | Guan | G06K 9/6267 |
| 2013/0064420 | A1 * | 3/2013 | Amin | G06K 9/0063 |
| | | | | 382/103 |

(Continued)

FOREIGN PATENT DOCUMENTS

| JP | 2001-143054 A | 5/2001 |
| JP | 2014-002738 A | 1/2014 |
| JP | 2016-126566 A | 7/2016 |

OTHER PUBLICATIONS

Meng Xu et al., "Thin Cloud Removal Based on Signal Transmission Principles and Spectral Mixture Analysis", IEEE Transactions on Geoscience and Remote Sensing, vol. 54, No. 3, Mar. 2016, pp. 1-11 (12 pages total).

Daniele Cerra et al., "Cloud Removal in Image Time Series through Unmixing", 2015 $8^{th}$ International Workshop on the Analysis of Multitemporal Remote Sensing Images (Multi-Temp), IEEE, 2015, (4 pages total).

(Continued)

*Primary Examiner* — Gabriel I Garcia
(74) *Attorney, Agent, or Firm* — Sughrue Mion, PLLC

(57) ABSTRACT

An image processing device which is capable of accurately detects and corrects areas affected by clouds even if multiple types or layers of clouds present in images, is disclosed. The device includes: a cloud spectrum selection unit for selecting at least one spectrum for each of pixels from spectra of one or more clouds present in an input image; an endmember extraction unit for extracting spectra of one or more endmembers other than the one or more clouds from those of the input image; and an unmixing unit for deriving fractional abundances of the respective spectra of one or more endmembers and a selected spectrum of one of the one or more clouds for the each of pixels in the input image.

16 Claims, 18 Drawing Sheets

(51) Int. Cl.
*G06K 9/38* (2006.01)
*G06T 5/40* (2006.01)

(58) Field of Classification Search
USPC .......................................................... 382/275
See application file for complete search history.

(56) References Cited

U.S. PATENT DOCUMENTS

| | | | |
|---|---|---|---|
| 2013/0336540 A1 | 12/2013 | Zhang et al. | |
| 2015/0006080 A1* | 1/2015 | Yamazaki | G01J 1/4228 |
| | | | 702/3 |
| 2017/0161584 A1* | 6/2017 | Guan | G06K 9/40 |
| 2020/0043136 A1* | 2/2020 | Nagare | G06T 5/002 |

OTHER PUBLICATIONS

Ronald M. Welch et al., "Cloud and Surface Textural Features in Polar Regions", IEEE Transactions on Geoscience and Remote Sensing, vol. 28, No. 4, Jul. 1990, pp. 520-528 (9 pages total).

Din-Chang Tseng et al., "Automatic cloud removal from multi-temporal SPOT images" Applied Mathematics and Computation, vol. 205, No. 2, 2008, pp. 584-600 (17 pages total).

Written Opinion of the International Searching Authority dated Feb. 7, 2018, in counterpart International Application No. PCT/JP2016/087862.

International Search Report dated Feb. 7, 2018, in counterpart International application No. PCT/JP2016/087862.

Japanese Office Action for JP Application No. 2019-527932 dated Jul. 28, 2020 with English Translation.

* cited by examiner

[Fig. 1]
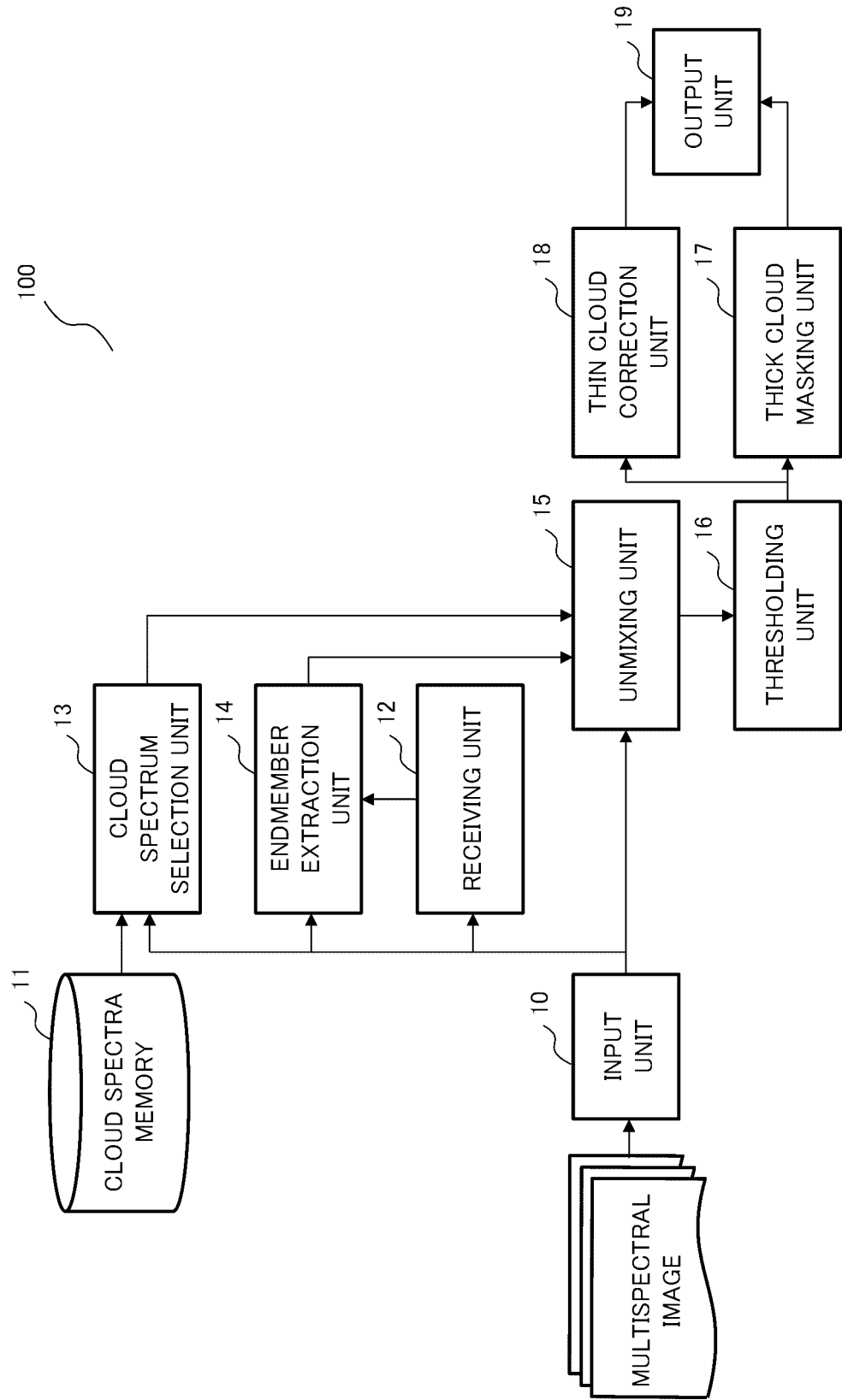

[Fig. 2]

|        | Band 1   | Band 2   | Band 3   | Band 4   | Band 5   | Band 6   | Band 7   |
|--------|----------|----------|----------|----------|----------|----------|----------|
| Cloud 1 | 0.268023 | 0.255365 | 0.230974 | 0.236826 | 0.338285 | 0.339504 | 0.292430 |
| Cloud 2 | 0.299042 | 0.287842 | 0.262772 | 0.270528 | 0.371271 | 0.364261 | 0.315229 |
| Cloud 3 | 0.324159 | 0.314304 | 0.288921 | 0.298798 | 0.402801 | 0.393224 | 0.348974 |
| . .    | . .      | . .      | . .      | . .      | . .      | . .      | . .      |
| Cloud N | 0.465346 | 0.467995 | 0.445105 | 0.468594 | 0.575583 | 0.468904 | 0.369260 |

[Fig. 3]
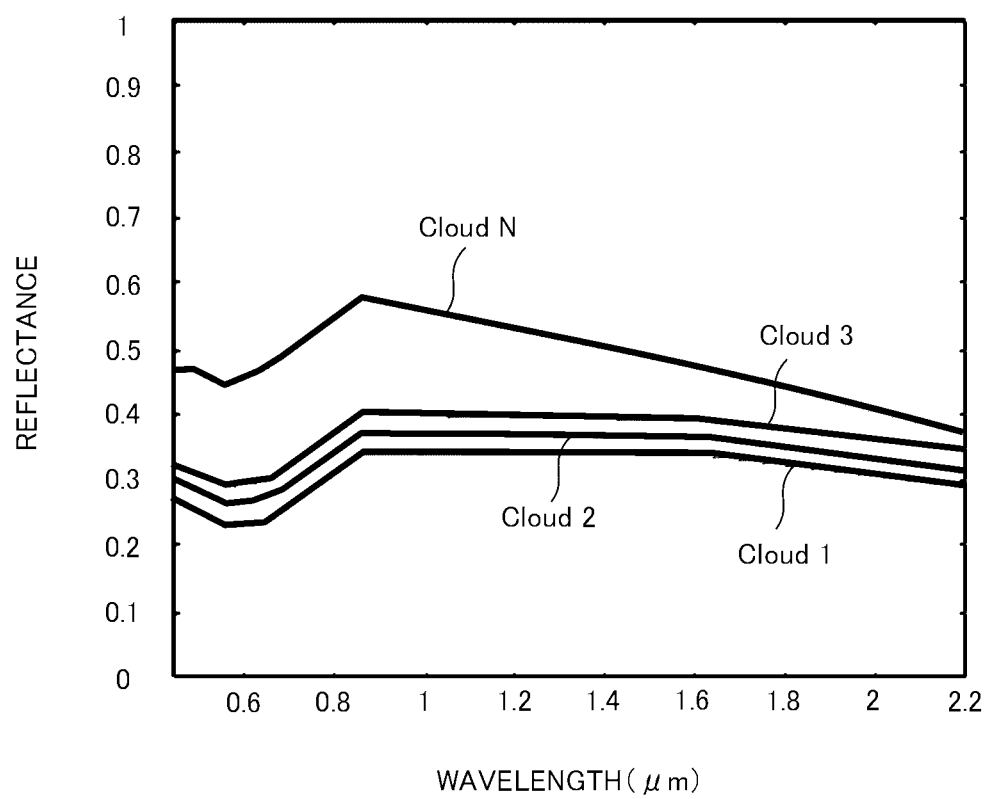

[Fig. 4]
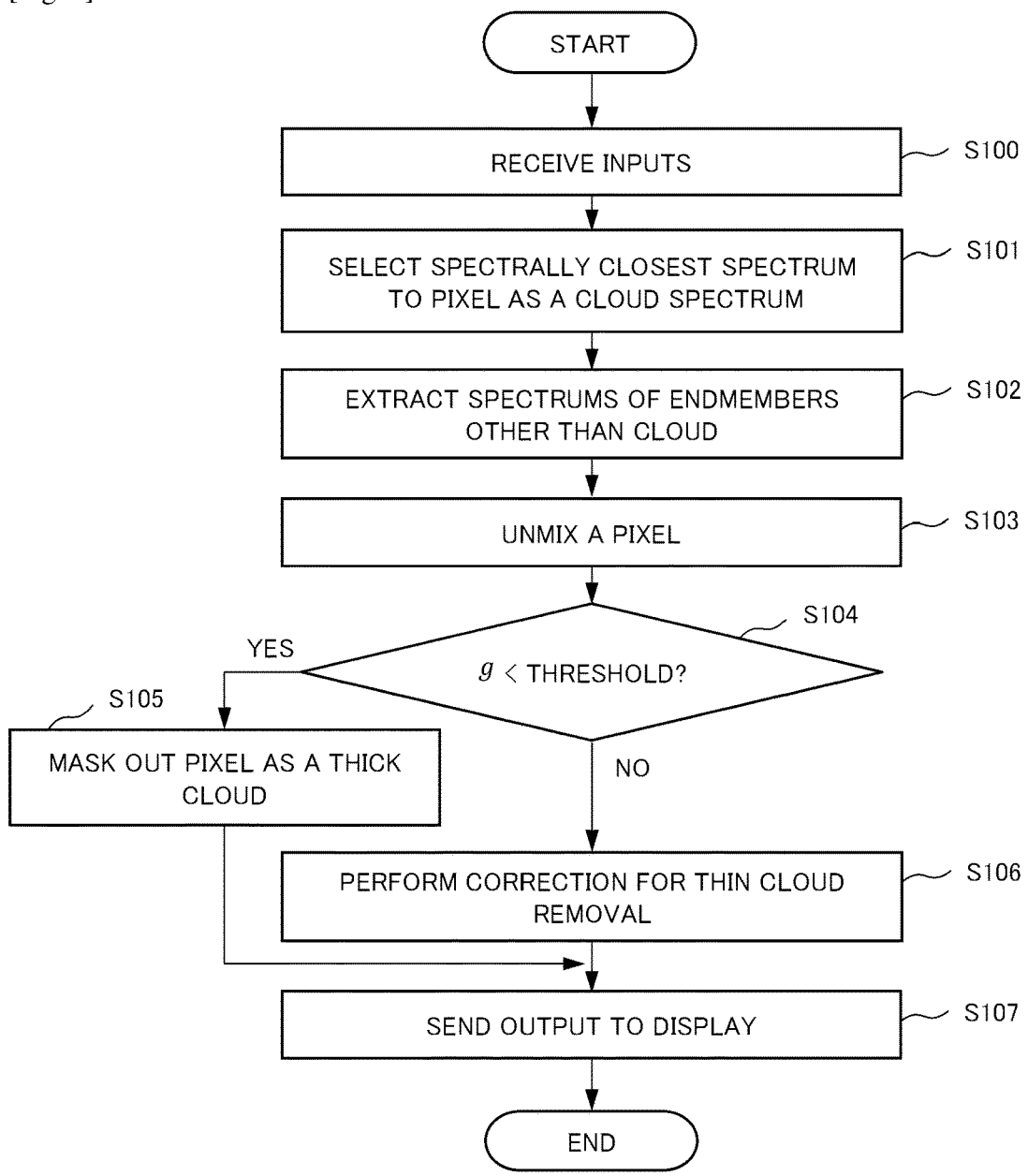
[Fig. 5]

[Fig. 6]

| ($P_{11}$) 0.525217 0.529302 0.516074 0.544729 0.644331 0.512398 0.383419 | ($P_{12}$) 0.316871 0.307005 0.282309 0.290415 0.388477 0.382602 0.349328 | ($P_{13}$) 0.216264 0.199988 0.179346 0.179503 0.297548 0.297391 0.241149 |
|---|---|---|
| ($P_{21}$) 0.461403 0.458984 0.453799 0.471112 0.579574 0.487482 0.370097 | ($P_{22}$) 0.202188 0.184938 0.162347 0.163981 0.275145 0.293997 0.231000 | ($P_{23}$) 0.240709 0.226915 0.205204 0.207498 0.325574 0.328559 0.278319 |
| ($P_{31}$) 0.190813 0.171742 0.149559 0.147925 0.245045 0.265405 0.199706 | ($P_{32}$) 0.334403 0.325103 0.288342 0.298082 0.399160 0.358660 0.304209 | ($P_{33}$) 0.334466 0.324695 0.290101 0.299024 0.397778 0.357717 0.303203 |

[Fig. 7]

| $N$ | 3 | 1 |
|---|---|---|
| $N$ | 1 | 1 |
| 1 | 2 | 2 |

[Fig. 8]
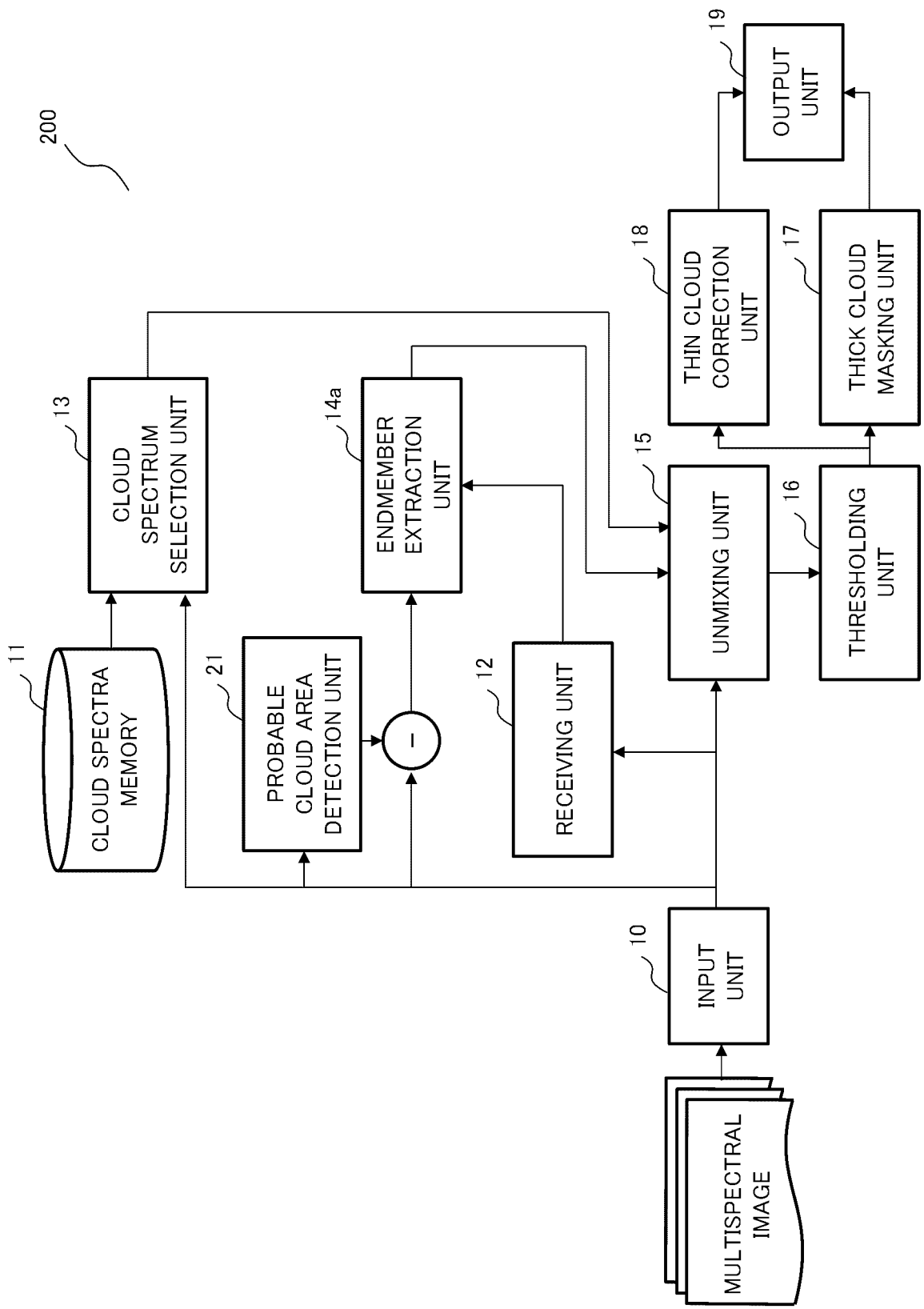

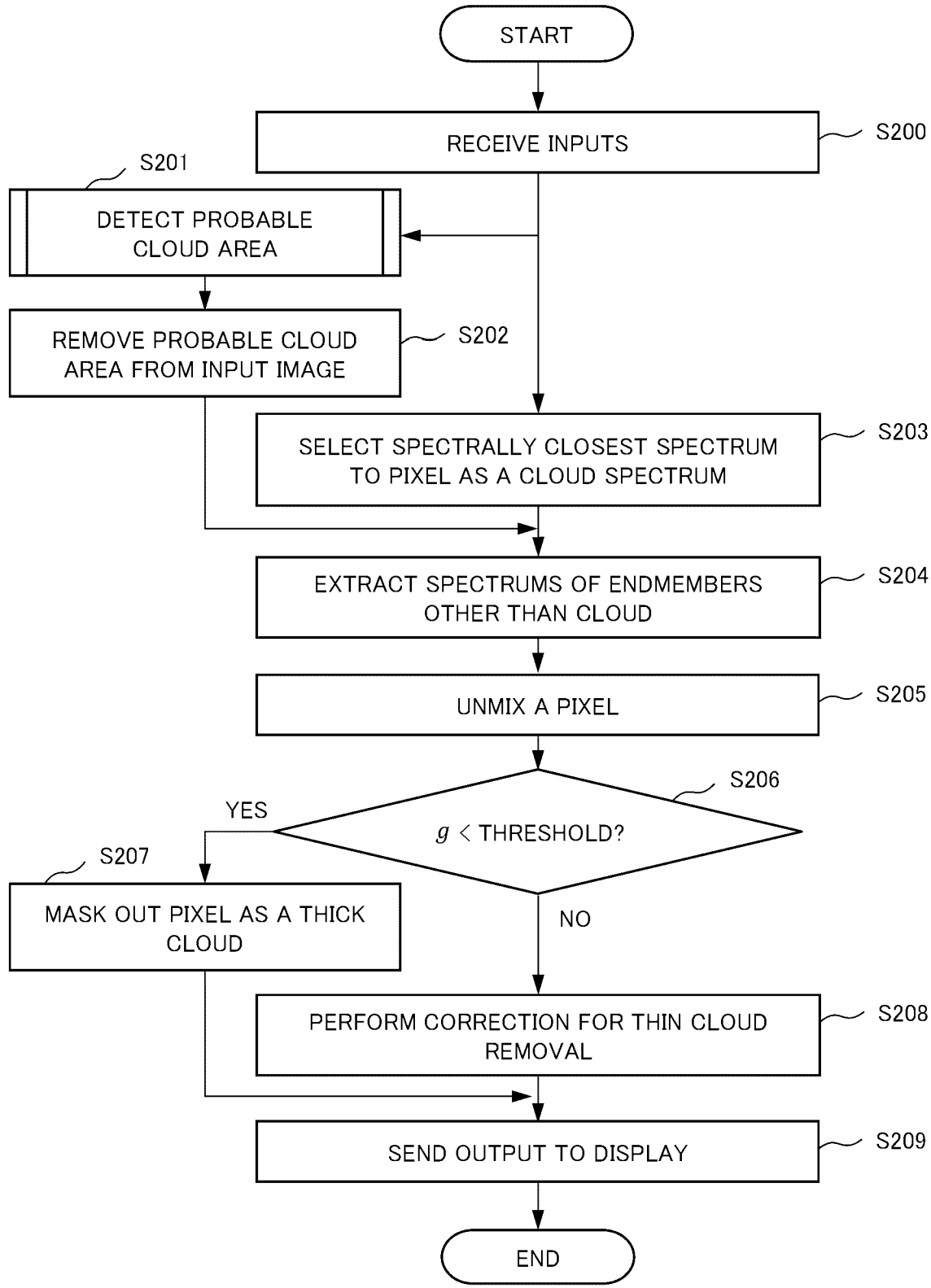
[Fig. 9]

[Fig. 10]
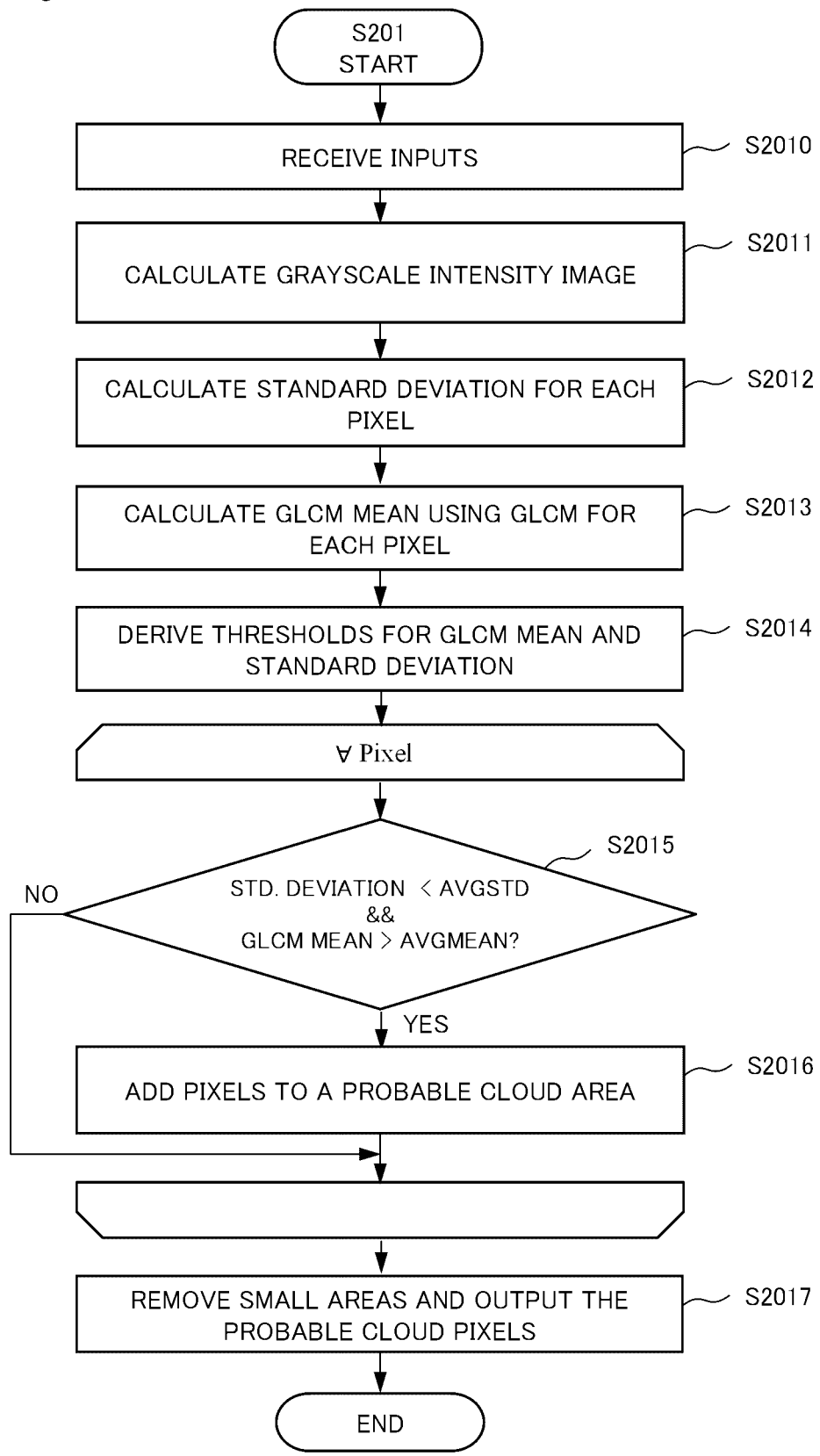

[Fig. 11]
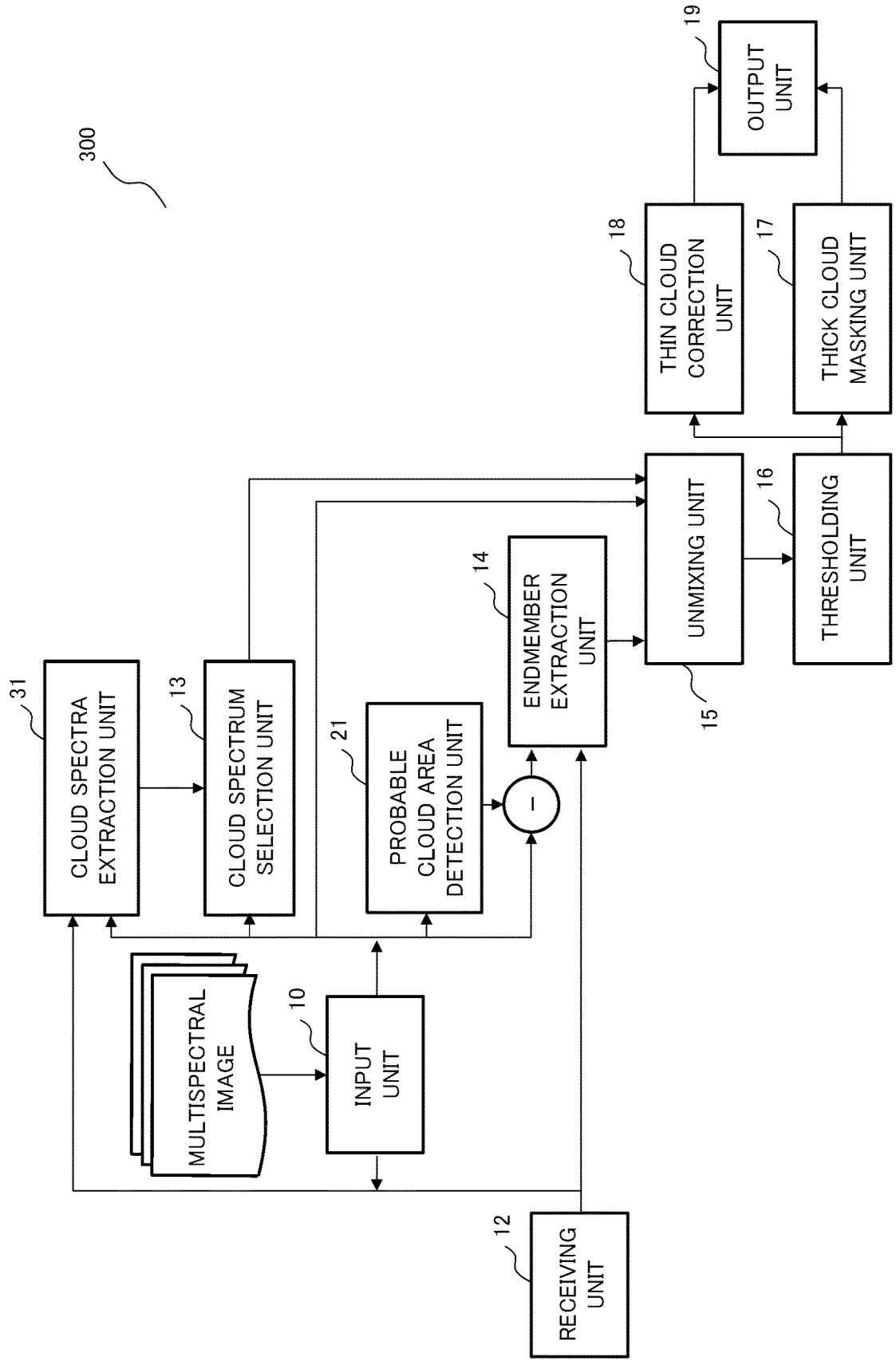

[Fig. 12]
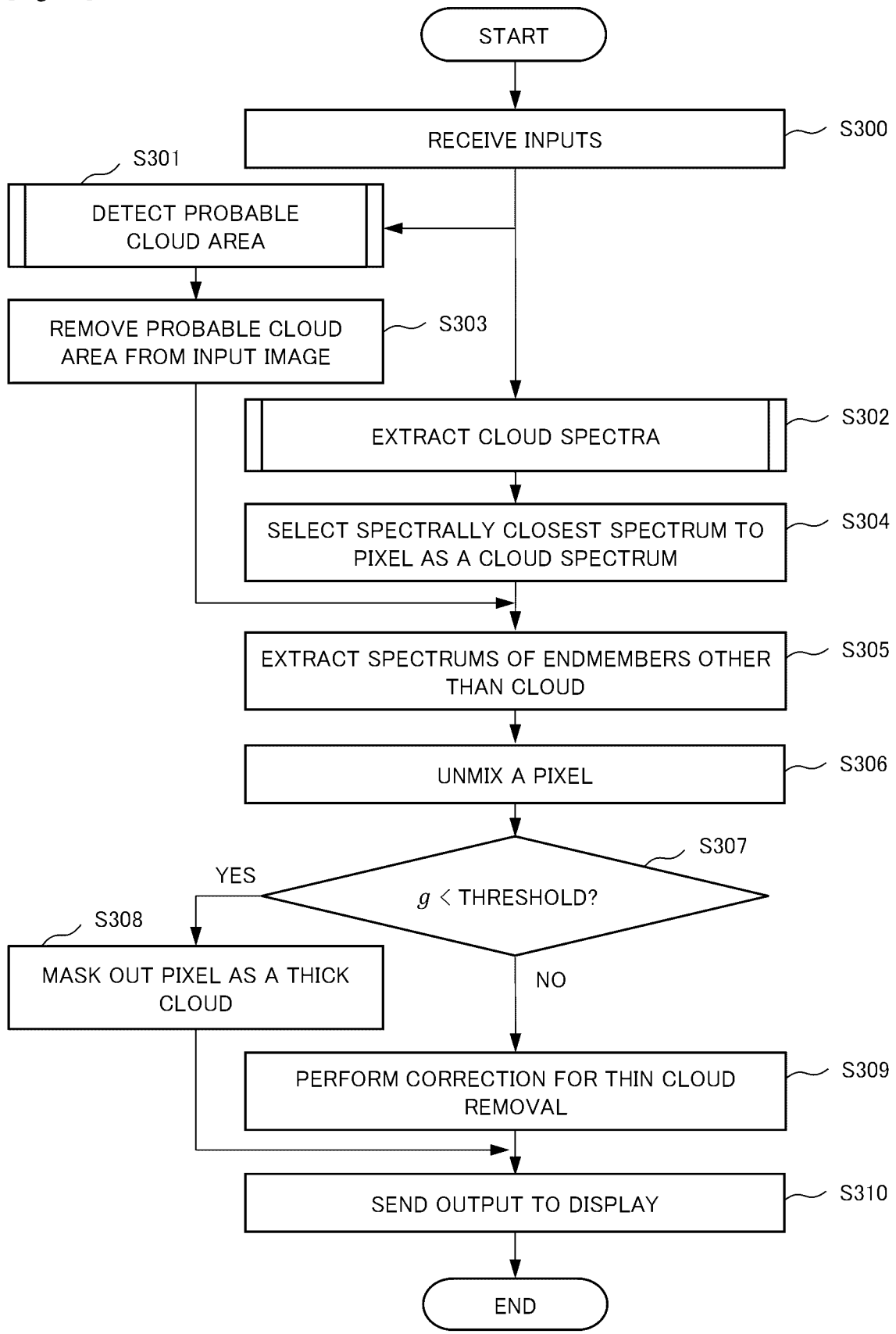

[Fig. 13]
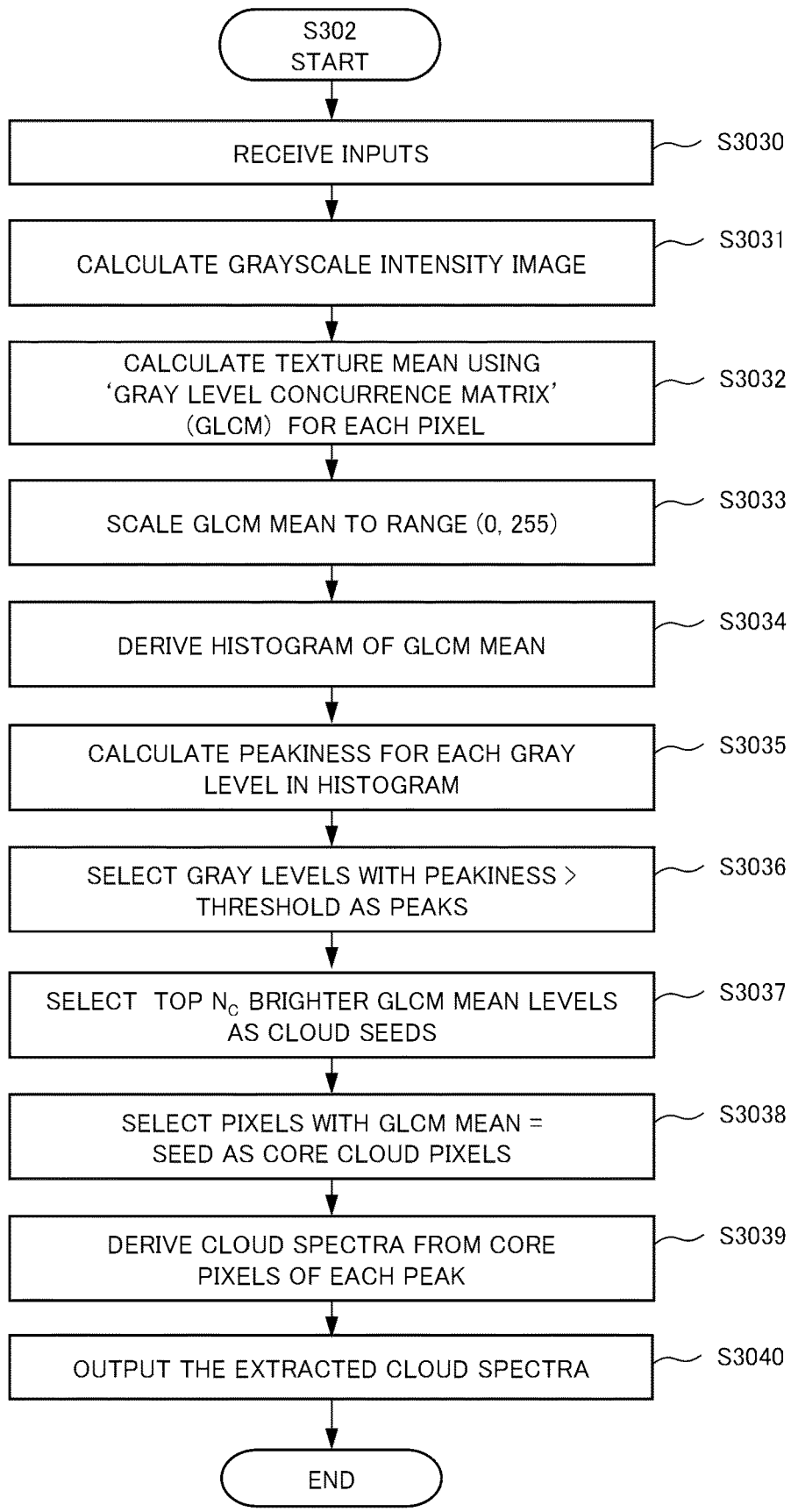

[Fig. 14]
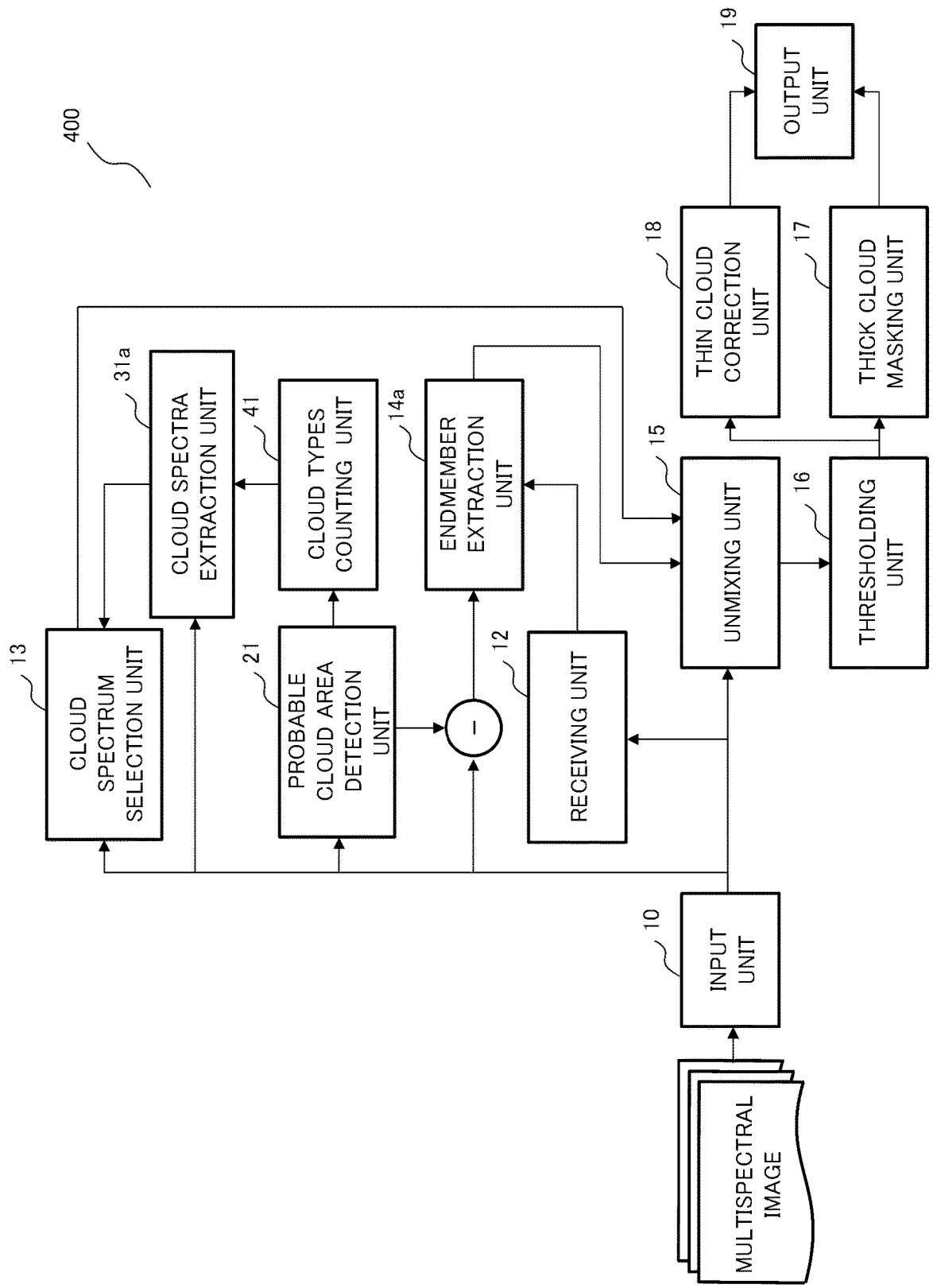

[Fig. 15]
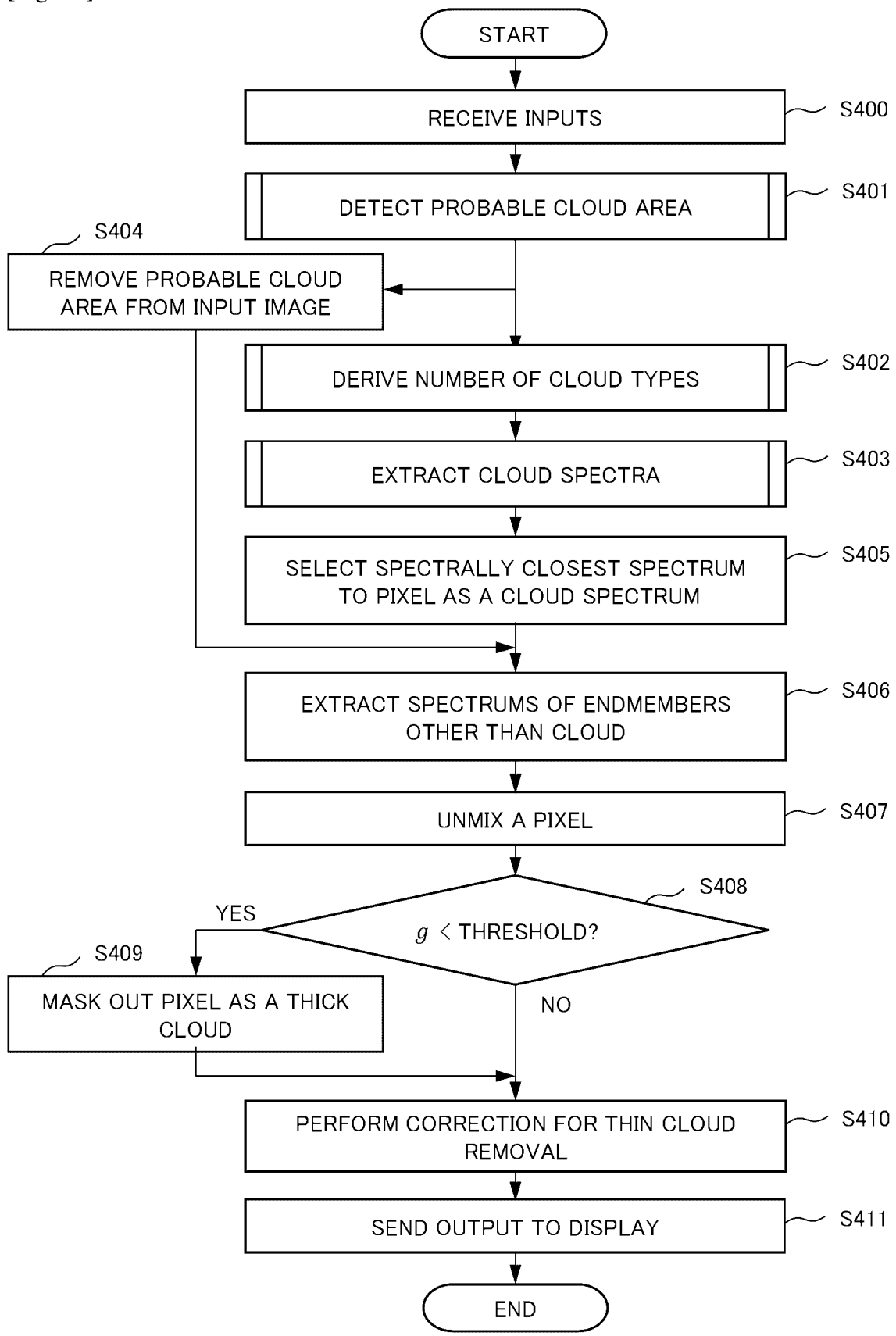

[Fig. 16]
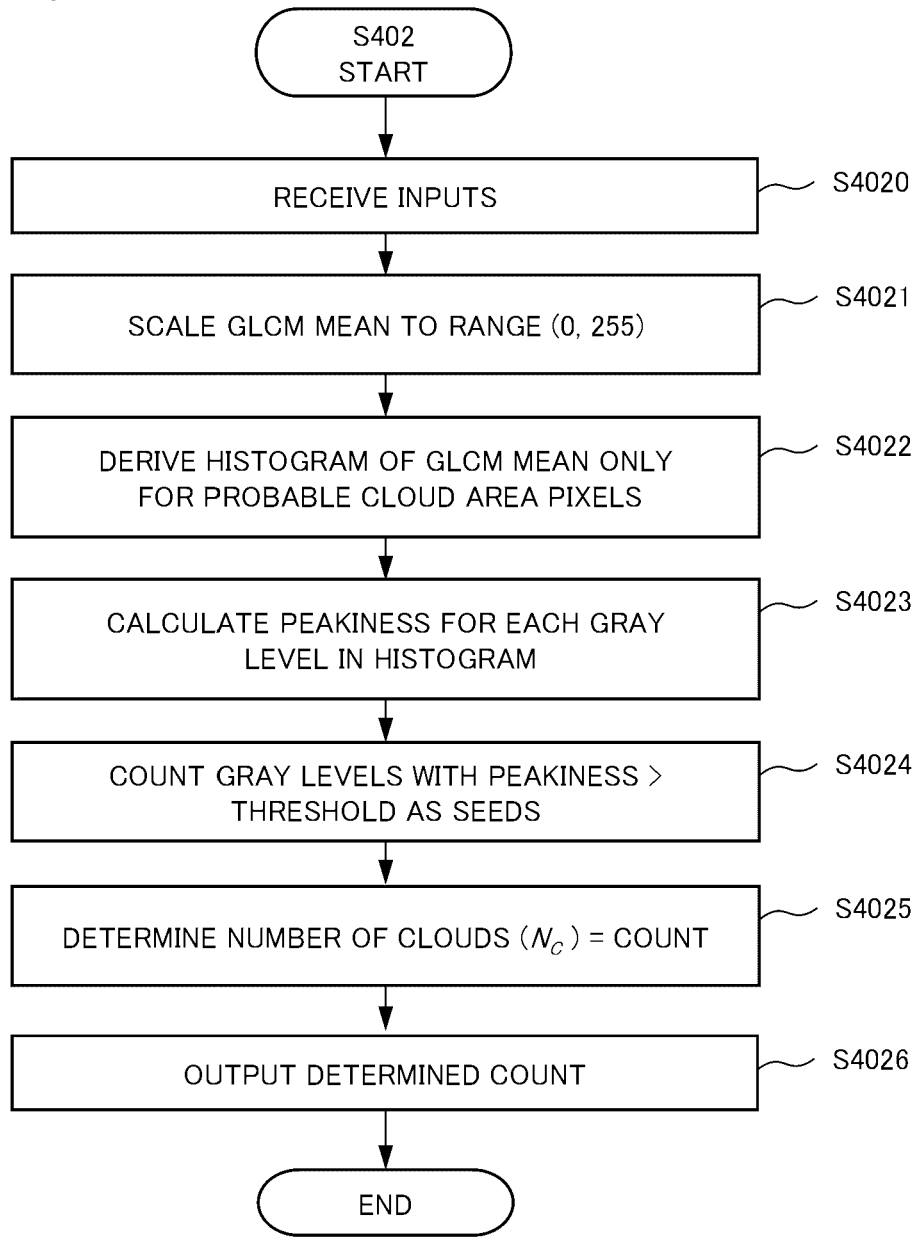

[Fig. 17]
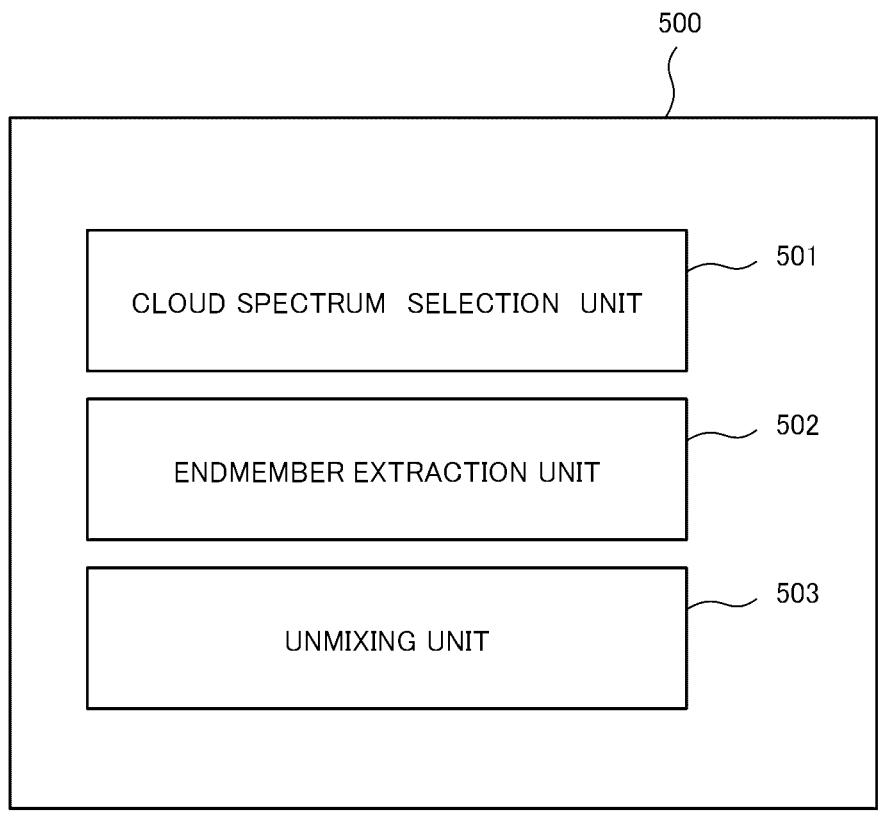

[Fig. 18]
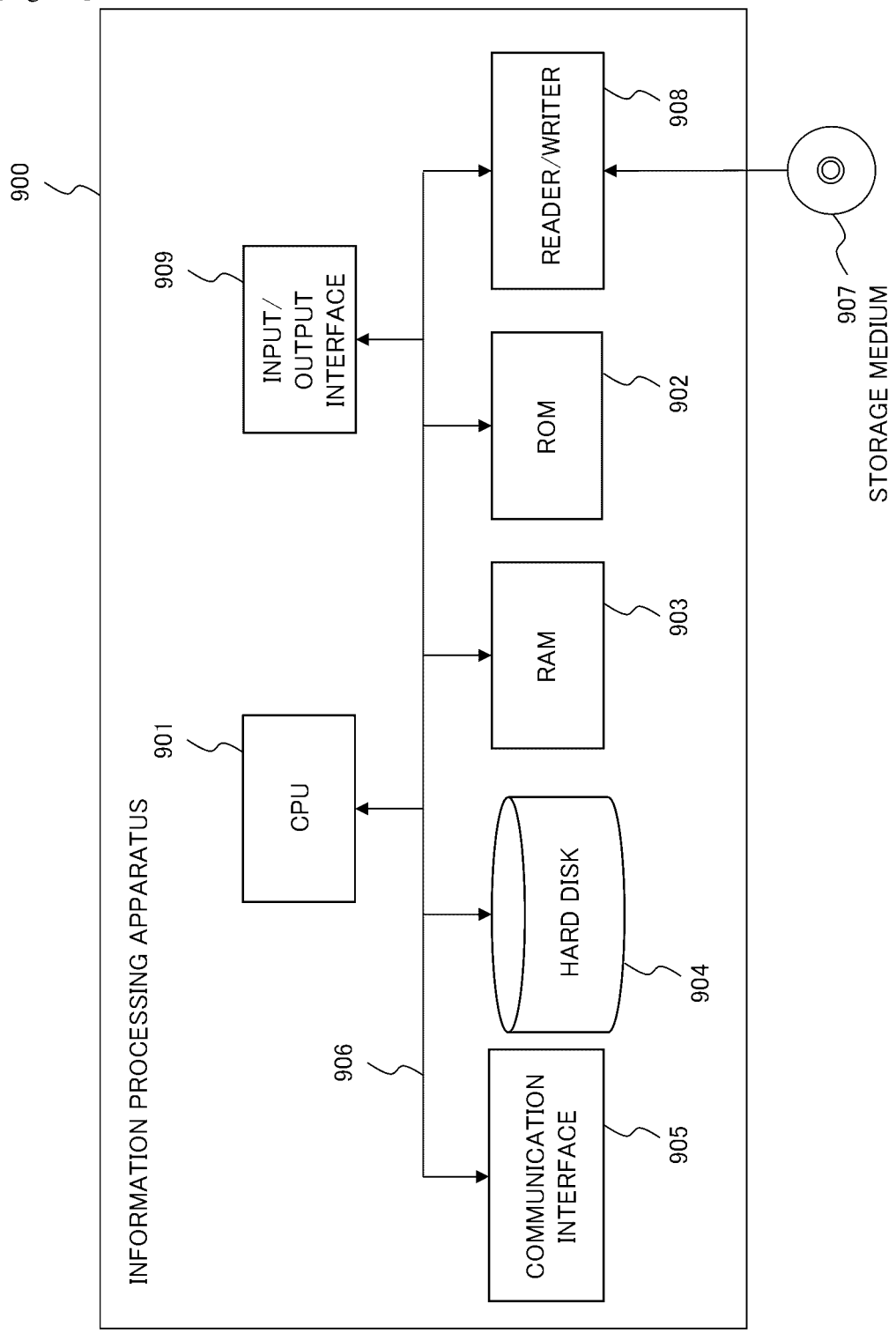

[Fig. 19]
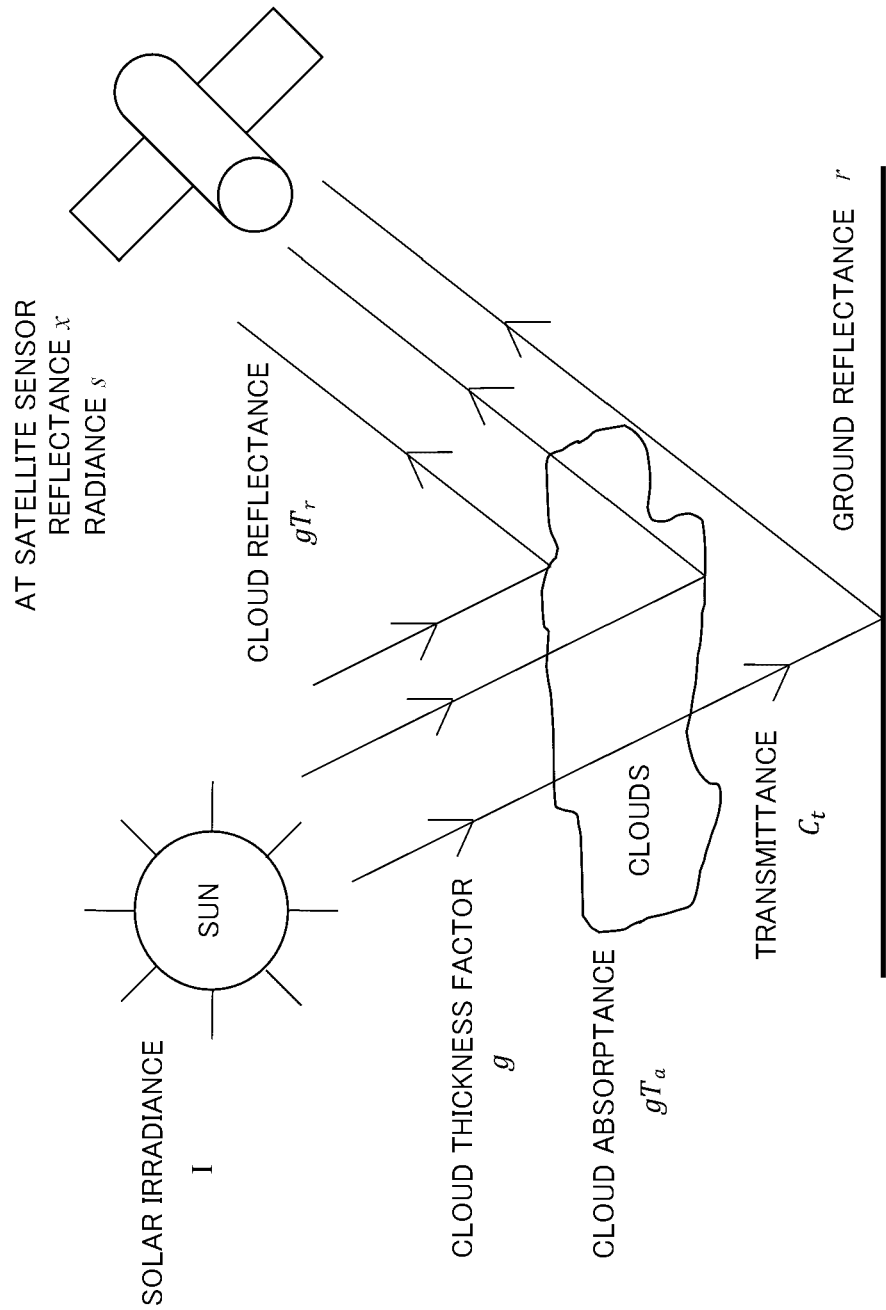

[Fig. 20]
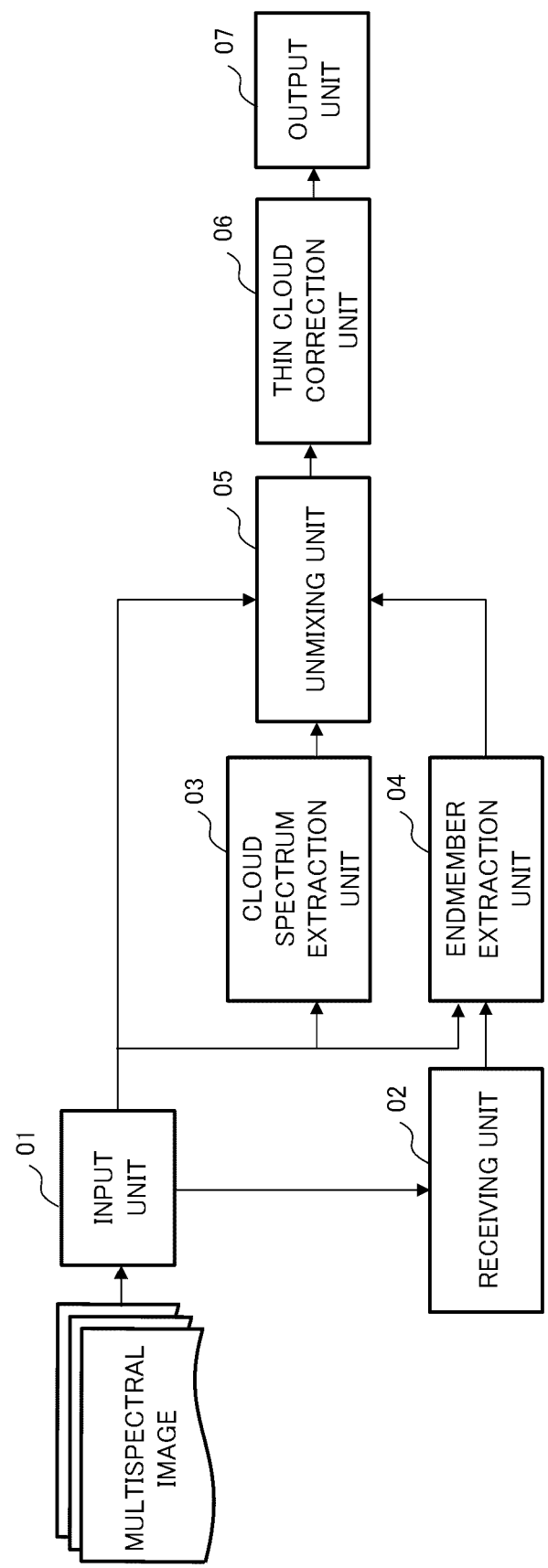

IMAGE PROCESSING DEVICE FOR DETECTION AND CORRECTION OF CLOUD COVER, IMAGE PROCESSING METHOD AND STORAGE MEDIUM

This application is a National Stage Entry of PCT/JP2016/087862 filed on Dec. 20, 2016, the contents of all of which are incorporated herein by reference, in their entirety.

TECHNICAL FIELD

The present invention relates to an image processing device, image processing method and storage medium storing an image processing program for detecting and correcting cloud covered areas in images captured by sensors on space-borne platforms.

BACKGROUND ART

Satellite images are important information source for monitoring earth surface observation. However, when a cloud cover is present in the images, it poses a serious limitation for their applications.

The NPL 1 discloses a Signal Transmission-Spectral Mixture Analysis (ST-SMA) method for removing a thin cloud cover in satellite images. This method estimates a cloud cover by employing a spectral unmixing technique and corrects affected pixels by the radiative transfer model. In the spectral unmixing technique, a pixel is assumed to be a mixture of endmembers, and a fractional abundance of each endmember in the pixel is estimated. An endmember is a pure class on the ground. For each pixel in the input image, the ST-SMA assumes a cloud as an endmember to estimate a fractional abundance of the cloud and removes the proportion of the cloud from respective pixels to correct an effect of the cloud. The detailed description of the ST-SMA method is provided below.

The FIG. 19 depicts a physical model of capturing a ground reflectance in the presence of clouds. Referring to FIG. 19, the physical model of cloud distortion using radiance values is given by equation (1)

$$s(i, j) = aIr(i, j)C_t(i, j) + I[1 - C_t(i, j)], \quad (1)$$

where "$s(i,j)$" is a received radiance signal at a satellite sensor for a pixel with coordinates "$i$" and "$j$", "$a$" is an atmospheric transmittance which is generally assumed as 1, "$I$" is solar irradiance, "$r(i,j)$" is a reflectance from the ground, and "$C_t(i,j)$" is a cloud transmittance observed for the pixel $(i, j)$. This equation assumes cloud absorptance to be 0.

Clouds can reflect, transmit and absorb the incident radiation. Expressing in terms of reflectance "$C_r$", absorptance "$C_a$", transmittance "$C_t$" coefficients, interaction of clouds with incident radiation can be shown below:

$$C_r + C_a + C_t = 1. \quad (2)$$

For a plurality of thick cloud ("T"), radiation will be reflected and absorbed completely but not transmitted. When "$T_r$", "$T_a$", "$T_t$" is reflectance, absorptance and transmittance of a thick cloud, respectively, an interaction of incident radiation with a thick cloud can be shown below:

$$T_t = 0, \therefore T_r + T_a = 1, \quad (3)$$

An assumption is made that absorptance and reflectance by a thin cloud are scaled values of absorptance and reflectance of a thick cloud. A further assumption is made; the scaling factor is proportional to the relative thickness of the thin cloud with respect to the thick cloud. Therefore, for a thin cloud, absorptance and reflectance will be the absorptance and reflectance of a thick cloud scaled by a thickness factor ("$g$") of the thin cloud. The g varies from 0 to 1 according to relative thickness of clouds with respect to thick clouds. "$g$" is 1 for thick clouds. These clouds are opaque clouds for which transmittance is 0.

Substituting absorptance and reflectance values for thin clouds in equation (2) and using equation (3), a cloud transmittance can be estimated as, $$C_r = gT_r, C_a = gT_a$$

$$\therefore gT_r + gT_a + C_t = 1$$

$$C_t = 1 - g(T_r + T_a)$$

$$C_t = 1 - g. \quad (4)$$

Referring to FIG. 19 and equations (1) and (4), the physical model of cloud distortion using reflectance values can be expressed in terms of optical properties of clouds as, $$x = (1-g)r + gs_c + e. \quad (5)$$

If L is the number of wavelength bands present in the input multispectral image, "$x$" is a spectral reflectance vector of a pixel of dimension L×1 as observed by the sensor, "$s_c$" is a spectral signature (spectrum) vector of clouds of dimension L×1, and "$e$" is a noise or model error vector of dimension L×1, "$e$" can be considered as a part of a pixel which cannot be modelled.

In equation (5), r can be expressed as a mixture of "M" endmembers as shown below:

$$x = (1-g)\sum_{m=1}^{M} a_m s_m + g s_c + e, \quad (6)$$

Such that, $$\sum_{m=1}^{M} a_m = 1, a_m \geq 0, 0 \leq g \leq 1. \quad (7)$$

"$s_m$" is a spectral signature vector of the $m^{th}$ endmember of dimension L×1, "$a_m$" is a fractional abundance of the $m^{th}$ endmember. Considering a cloud as an $(M+1)^{th}$ endmember, equation (6) and equation (7) can be modified as, $$x = \sum_{m=1}^{M+1} b_m s_m + e,$$

where, $a_{M+1} = g/(1-g)$, $s_{M+1} = s_c$, $b_m = (1-g)a_m$. (8)

Such that, $$\sum_{m=1}^{M} b_m = 1 - g, 0 \leq b_m \leq g, 0 \leq g \leq 1. \quad (9)$$

Equation (8) is similar to the linear spectral mixture model (LSMM) with different constraints. The model in equation (8) and (9) can be interpreted as, a cloud is a $(M+1)^{th}$ endmember and g is the fractional abundance of the cloud.

This equation is solved by the fully constrained linear mixture analysis algorithm to give a fractional abundance of a cloud (and thus g). the equation (8) with constraints in equation (9) can be solved as long as "L>M+1". Therefore, the technique is most suitable for multispectral or hyperspectral images.

By equation (5), assuming the model error e to be 0 or negligible, the true reflectance of a pixel can be retrieved as shown below:

$$r = \frac{1}{(1-g)}(x - gs_c). \quad (10)$$

The correction in equation (10) cannot be done for a pixel if g=1, it implies the pixel is covered by thick clouds and should be masked out or replaced by another image source.

FIG. 20 is a block diagram showing an exemplary apparatus of the ST-SMA method described by the inventor of the application. It includs an input unit 01, a receiving unit 02, a cloud spectrum extraction unit 03, an endmember extraction unit 04, an unmixing unit 05, a thin cloud correction unit 06 and an output unit 07.

The input unit 01 receives a multispectral image as an input. The receiving unit 02 receives the number of endmembers other than cloud in the input image from an operator. The cloud spectrum extraction unit 03 selects a cloud spectrum from the image as a spectrum of the brightest pixel in the image. The endmember extraction unit 04 receives the number of endmembers other than clouds in the input image as an input and extracts equal number of spectra of endmembers from the input image by employing an unsupervised endmember extraction algorithm, Vertex Component Analysis (VCA). The unmixing unit 05 unmixes each pixel in the input image using equation (8) by imposing constraints given by equation (9) to give a fractional abundance of a cloud. The thin cloud correction unit 06 performs the thin cloud correction by using the fractional abundance of a cloud, i.e. retrieves the true reflectance of a pixel affected by a thin cloud using equation (10). The output unit 07 sends an image corrected for thin cloud cover to the display.

CITATION LIST

Non Patent Literature

[NPTL1] Xu, M., Pickering, M., Plaza, A. J. and Jia, X., "Thin Cloud Removal Based on Signal Transmission Principles and Spectral Mixture Analysis," IEEE Transactions on Geoscience and Remote Sensing (Volume: 54, Issue: 3, March 2016), Page(s): 1659-1669.

SUMMARY OF INVENTION

Technical Problem

The method in NPL 1 can give a good estimation of the true reflectance from the ground under a thin cloud cover only when a spectrum of the cloud is accurately determined. The method of selecting a spectrum of the brightest pixel as a cloud spectrum, can get confused with other bright objects such as sand, rooftops.

In addition, some images may have different types or layers of clouds. Different clouds have different composition, accordingly they show different absorption, reflection features as well as different amount of absorption and reflection. If there are different layers of clouds then clouds at higher altitude may form a shadow on clouds at low altitude. Therefore, clouds at lower altitude show reflection properties of lower magnitude than the actual one. The clouds with higher water content or with shadow look darker. If the ST-SMA method is applied to scenes containing darker clouds along with bright clouds then it erroneously corrects darker clouds as water on the ground. Therefore, it is necessary to consider dark and bright clouds separately.

Further, the method in the prior art has a strict constraint (g=1) for marking pixel as a thick cloud. This is not practical because of the variability present within the cloud spectra. All pixels contaminated by thick clouds do not have exactly the same spectrum because clouds are wide spread and can have different composition. As a result, even though a cloud spectrum is accurately selected, the method in the prior art cannot detect a thick cloud cover completely.

Therefore, the algorithm equipped in the method given in NPL 1 cannot perform well for complex scenes having different types or layers of clouds or brighter objects than clouds. The limitation can be attributed to the cloud spectrum extraction technique in the method. In addition it cannot detect thick cloud cover completely.

The present invention is made in view of the above mentioned situation, and an object of the present invention is to provide a technique capable of accurately detecting areas affected by clouds and correcting effects of the clouds even if multiple types or layers of clouds are present in images.

Solution to Problem

In order to solve the above-mentioned problem, a first exemplary aspect of the present invention is an image processing device for detection and correction of a cloud cover. The device includes:

a cloud spectrum selection unit for selecting at least one spectrum for each of pixels from spectra of one or more clouds present in an input image;

an endmember extraction unit for extracting spectra of one or more endmembers other than the one or more clouds from those of the input image; and an unmixing unit for deriving fractional abundances of the respective spectra of one or more endmembers and a selected spectrum of one of the one or more clouds for the each of pixels in the input image.

A second exemplary aspect of the present invention is an image processing method. The method includes:

selecting at least one spectrum for each of pixels from spectra of one or more clouds present in an input image;

extracting spectra of one or more endmembers other than the one or more clouds from those of the input image; and deriving fractional abundances of the respective spectra of one or more endmembers and a selected spectrum of one of the one or more clouds for the each of pixels in the input image.

A third exemplary aspect of the present invention is a storage medium for storing an image processing program. The program includes:

selecting at least one spectrum for each of pixels from spectra of one or more clouds present in an input image;

extracting spectra of one or more endmembers other than the one or more clouds from those of the input image; and deriving fractional abundances of the respective spectra of one or more endmembers and a selected spectrum of one of the one or more clouds for the each of pixels in the input image.

Advantageous Effects of Invention

According to the present invention, image processing device, image processing method and storage medium storing image processing program which accurately detect areas affected by clouds and correct effects of the clouds even if multiple types or layers of clouds are present in images are provided.

BRIEF DESCRIPTION OF DRAWINGS

FIG. 1 is a block diagram of the first example embodiment in accordance with the present invention.

FIG. 2 is a table showing cloud spectra stored in the cloud spectra memory.

FIG. 3 is a graph showing pictorial representation of cloud spectra stored in the cloud spectra memory.

FIG. 4 is a flow chart of the procedure of the first example embodiment in accordance with the present invention.

FIG. 5 is a table showing a layout of pixels locations in a subset of an input image.

FIG. 6 is a table showing spectral values of pixels in the subset shown in FIG. 5.

FIG. 7 is a table showing an index number of selected cloud spectrum for pixels in the subset shown in FIG. 5.

FIG. 8 is a block diagram of the second example embodiment in accordance with the present invention.

FIG. 9 is a flow chart of the procedure of the second example embodiment in accordance with the present invention.

FIG. 10 is a flow chart of the procedure to detect a probable cloud area in step S201 in FIG. 9.

FIG. 11 is a block diagram of the third example embodiment in accordance with the present invention.

FIG. 12 is a flow chart of procedure of the third example embodiment in accordance with the present invention.

FIG. 13 is a flow chart of procedure to extract cloud spectra in step S302 in FIG. 12.

FIG. 14 is a block diagram of the fourth example embodiment in accordance with the present invention.

FIG. 15 is a flow chart of procedure of the fourth example embodiment in accordance with the present invention.

FIG. 16 is a flow chart of procedure to determine a plurality of types of cloud in the input image in step S402 in FIG. 15.

FIG. 17 is a block diagram of the fifth example embodiment in accordance with the present invention.

FIG. 18 is a block diagram showing a configuration of an information processing apparatus.

FIG. 19 is a depiction of the physical model for radiation in the presence of clouds.

FIG. 20 is a block diagram of the method described in NPL 1 (ST-SMA)

Skilled artisans will appreciate that elements in the figures are illustrated for simplicity and clarity and have not necessarily been drawn to scale. For example, the dimensions of some of the elements in the figures illustrating the physical model for radiation in the presence of clouds, may be exaggerated relative to other elements to help to improve understanding of the present and alternate example embodiments.

DESCRIPTION OF EMBODIMENTS

Satellite images which are captured by sensors on space-borne platforms provide huge amount of information about earth surfaces. Many space-borne platforms have sensors capable of capturing multi- or hyper-spectral images from which we can extract much more detailed information about characteristics of objects on the ground than that of RGB images. A multispectral image is an image including response of a scene captured at multiple and specific wavelengths in the electromagnetic spectrum. Generally images having more than three (RGB) bands are referred to as multispectral images.

These images are, however, affected by the weather conditions while capturing. Around two-thirds of the earth surface is covered by clouds throughout the year. Therefore, it is difficult to get a cloud free scene for all images. A cloud cover (a surface area of a cloud visible in an image) in an image poses a serious limitation for the use of satellite images in advanced image processing operation like land use land cover classification etc. If images with a cloud cover are used for a high level analysis, then unreliable results are obtained.

The detection of an area contaminated by clouds and estimation of extent of the contamination are important preprocessing tasks. If clouds are too thick and thereby block (occlude) the complete radiation then that area has to be detected and recovered from other sources of information. However, if a cloud cover is thin enough then it is possible to retrieve the ground information to some extent from the given image. A thick cloud means an atmospheric cloud which blocks the sensor view completely while a thin cloud blocks partially. There could be many types of clouds and different layers of clouds.

The method in NPL 1 provides a method to correct pixels affected by a thin cloud cover based on a spectral unmixing technique and the radiative transfer model. However, an accuracy of the correction of pixels covered by thin clouds depends on the accuracy of the extracted cloud spectrum. A pixel means a physical point and is a unit element of an image. A spectrum of an object means a reflectance spectrum consisting of a set of reflectance values of the object, one for each wavelength band. The 'spectral unmixing means' a procedure of deriving constituent endmembers of a pixel and their fractional abundance in the pixel based on spectrum of the pixel and endmembers. NPL 1 considers a spectrum of the brightest pixel as a cloud spectrum, however, it is not the best way. In many scenes, the brightest pixel can be of other bright objects on the ground, such as sand area and rooftop etc.

In addition, types of clouds differ with altitude and composition, and these different types of clouds show different spectral features. If a cloud cover at a location is composed of layered multiple clouds at different altitudes, then clouds at higher altitude might form a shadow on clouds at lower altitude. Clouds with higher water content or covered by shadow are darker in appearance and show variants of spectrum of the brightest one.

The unmixing technique, followed by thin cloud correction is likely to retrieve pixels covered by such darker clouds incorrectly as water on the ground when only a spectrum of the brightest pixel is considered as a cloud spectrum. This is because the method in NPL 1 assumes presence of only one cloud which is the brightest one. Therefore, the selected cloud spectrum is not accurate for many pixels, so the technique in NPL1 cannot give the desired results.

Furthermore, a strict constraint (g=1) on marking pixel as a thick cloud is not practical. This is due to variability of a cloud spectrum. All pixels contaminated by thick clouds do not have exactly the same spectrum because clouds are wide spread and can have different composition. Even though a cloud spectrum is accurately selected, the method in NPL 1 cannot detect a thick cloud cover completely because of the strict condition.

Each example embodiment of the present invention which can solve the above mentioned problems will be described below, with reference to drawings. The following detailed descriptions are merely exemplary in nature and are not intended to limit the invention or the application and uses of the invention. Furthermore, there is no intention to be bound by any theory presented in the preceding background of the invention or the following detailed description.

First Embodiment

There are many different types and layers of clouds in the sky. Considering different types of clouds separately can improve the performance of the cloud detection and correction method. In the first example embodiment, an image processing device which takes different types of clouds into account to finally obtain accurate observation results is described.

Image Processing Device

FIG. 1 is a block diagram showing the configuration of the image processing device 100 of the first example embodiment in accordance with the present invention. The image processing device 100 includes an input unit 10, a cloud spectra memory 11, a receiving unit 12, a cloud spectrum selection unit 13, an endmember extraction unit 14, an unmixing unit 15, a thresholding unit 16, a thick cloud masking unit 17, a thin cloud correction unit 18 and an output unit 19.

The input unit 10 receives a multispectral image from sensors on space-borne platforms (Not shown in FIG. 1) via wireless communication, and sends the input image to the cloud spectrum selection unit 13, the endmember extraction unit 14, the receiving unit 12 and the unmixing unit 15.

The cloud spectra memory 11 stores various cloud spectra which are generally observed in satellite images in a database or table format. As shown in FIG. 2, cloud spectra can be stored as a table with cloud No. (number) rows and band No. columns. The cloud No. represents a kind of clouds, each of the cloud kinds corresponds to the number. Each kind of cloud has a different spectrum. The band No. represents a kind of wavelength bands for example visible, near infrared, short wave infrared bands etc., each of the bands corresponds to a number. For example, Band 1 is a Coastal Aerosol band and the wavelength range is between 0.43-0.45 (μm), Band 2 is a Blue band and the wavelength range is between 0.45-0.51 (μm).

As shown in FIG. 3, the cloud spectra memory can be depicted as a graph with a reflectance as a vertical axis, and wavelength (μm) as a horizontal axis. In the graph, each of lines corresponds to a kind of clouds (cloud No.). Each of bands corresponds to its wavelength range. The spectra in the cloud spectra memory 11 are available to the cloud spectrum selection unit 13.

The receiving unit 12 determines the number of endmembers other than a cloud in an image. If L is the number of wavelength bands present in the input multispectral image, the number of endmembers is automatically restricted to L minus 2, due to constrains in equation (9). Alternatively, an operator can input the number of endmembers in the image by visual inspection. The receiving unit 12 sends the determined number of endmembers to the endmember extraction unit 14.

The cloud spectrum selection unit 13 acquires the input multispectral image from the input unit 10 and all cloud spectra from the cloud spectra memory 11 to select a cloud spectrum for each pixel in the input image. For each pixel in the input image, the cloud spectrum selection unit 13 determines a cloud spectrum which probably have contaminated the respective pixels.

The input image includes $N_c$ cloud spectra out of N, where $N_c$ and N are positive integer numbers, and $1 \le N_c \le N$ (the same shall apply hereinafter), cloud spectra stored in the cloud spectra memory 11.

For a pixel, the cloud spectrum selection unit 13 selects the spectrally closest cloud spectrum with the pixel's spectrum in a feature space of multiple dimensions, each of which corresponds to a specific wavelength band in an image. The cloud spectrum selection unit 13 measures the spectral closeness by means of spectral angle ("W") between two spectra as in equation (11).

$$W = \cos^{-1}\left(\frac{x \cdot s_c}{|x||s_c|}\right), \quad (11)$$

where $x \cdot s_c$ represents a dot product of vectors x and $s_c$, and $|x|$, $|s_c|$ are magnitudes of vector x and $s_c$, respectively. The magnitude of the angle (W) is inversely proportional to the degree of similarity between the spectra in the feature spaces. Therefore, among the N cloud spectra available in the cloud spectra memory 11, a spectrum which gives minimum W with a pixel is selected as a spectrum of a cloud which probably have contaminated the pixel.

Alternatively, for a pixel, the cloud spectrum selection unit 13 can select a spectrum of a cloud which is spatially closest to the location of the pixel in the input image. The cloud spectrum selection unit 13 sends selected cloud spectra for respective pixels to the unmixing unit 15.

The endmember extraction unit 14 acquires the multispectral image from the input unit 10 and the number of endmembers from the receiving unit 12 and extracts equal number of spectra of endmembers other than clouds. An endmember means a pure land cover class in an image. A choice of the land cover class (endmember) depends on an application, such as vegetation, water in change detection, in addition to this, cedar, cypress in forest monitoring.

If we identify representative pixels for an endmember in the image, mean spectrum of representative pixels can be taken as an endmember spectrum. However, generally such representative pixels are not easily available. Alternatively, the endmember extraction unit 14 can perform extraction by the well-known unsupervised endmember extraction algorithms such as Pixel Purity Index, N-FINDR, and Vertex Component Analysis (VCA). Alternatively, the endmember extraction unit 14 can perform the extraction by first using an unsupervised clustering then selecting endmember spectra as means of respective clusters and considering only those spectra which are not similar to cloud spectra.

The endmember extraction unit 14 sends extracted spectra of endmembers to the unmixing unit 15.

The unmixing unit 15 acquires three inputs, an input multispectral image from the input unit 10, endmembers' spectra from the endmember extraction unit 14 and selected cloud spectrum for each pixel in the image from the cloud spectrum selection unit 13. The unmixing unit 15 determines fractional abundances (a relative proportion of an endmember in a pixel) of all endmembers and a cloud in the pixel. For an input spectrum of a pixel, the unmixing unit 15 determines coefficients of linear mixture of spectra of endmembers and the cloud by an iterative least square approach: fully constrained linear mixture analysis. The coefficients of the linear mixture model are fractional abundances of the endmembers and the cloud. The unmixing unit 15 does unmixing such that if spectra of the endmembers and the cloud are scaled by the respective fractional abundance obtained and added linearly then the spectrum of the input pixel is obtained. The unmixing problem can be defined by equation (8) with constraints given by equation (9). Based on the above description, the unmixing unit 15 obtains a fractional abundance of a cloud (g) and sends it to the thresholding unit 16.

The thresholding unit 16 receives the abundance of a cloud in each pixel in the input image from the unmixing unit 15. Then the thresholding unit 16 separates pixels covered by thick clouds from pixels affected by thin clouds based on a result of comparison between a threshold and the obtained fractional abundance of the cloud (g). An operator can set the threshold in advance. When the abundance of a cloud for a pixel is greater than or equal to the threshold, then the thresholding unit 16 sends the pixel to the thick cloud masking unit 17. When the abundance of a cloud for a pixel is not greater than the threshold, the thresholding unit 16 sends the pixel along with cloud proportion (g) for respective pixels to the thin cloud correction unit 18.

The thick cloud masking unit 17 receives pixels covered by thick clouds from the thresholding unit 16. The thick cloud masking unit 17 marks the input pixels as a thick cloud, masks the pixels out and sends to the output unit 19.

The thin cloud correction unit 18 receives pixels which are not covered by thick clouds along with cloud proportion in respective pixels from the thresholding unit 16. The thin cloud correction unit 18 retrieves the true pixel reflectance by using equation (10) and corrects the input pixels with the calculation result. For clear pixels, g is 0, so clear pixels will remain affected by the equation (10). The thin cloud correction unit 18 sends corrected pixels along with clear pixels to the output unit 19.

The output unit 19 receives masked out pixels which are covered by thick clouds from the thick cloud masking unit 17, corrected pixels which are affected by thin clouds and clear pixels from the thin cloud correction unit 18. The output unit 19 combines all of the inputs and sends combined image as an output on display (Not shown in FIG. 1).

Operation of Image Processing Device

FIG. 4 shows a flowchart which shows the operation of the image processing device 100, on the assumption that required spectra are stored in the cloud spectra memory 11. The operations of steps S101 and S103 to S107 are performed for each of all pixels.

At first, in step S100, the input unit 10 receives a multispectral image. The receiving unit 12 receives the number of endmembers.

In step S101, the cloud spectrum selection unit 13 acquires the input multispectral image from the input unit 10, and for each pixel in the input image selects the closest cloud spectrum to respective pixels' spectrum among the spectra stored in the cloud spectra memory 11.

An example will be given below. FIG. 2 shows a table of spectra stored in the cloud spectra memory 11. FIG. 5 shows a table of layout of pixels in a subset of the input multispectral image. Each of compartments in the image such as $P_{11}$, $P_{12}$, exemplarily indicates each of pixels. FIG. 6 shows actual spectral values of each pixel corresponding to each of wavelength bands (from the top, band 1 to band 7). The cloud spectrum selection unit 13 calculates, by using equation (11), a spectral angle between a pixel and each cloud spectrum in the cloud spectra memory 11 to select the closest cloud spectrum based on the calculation result.

For example, the cloud spectrum selection unit 13 calculates a spectral angle between $P_{11}$ in FIG. 5 and cloud 1 in FIG. 2 as follows:

$$W = \cos^{-1}\left[\frac{0.268023 \times 0.525217 + 0.255365 \times 0.529302 + \ldots + 0.292430 \times 0.383419}{\left(\sqrt{0.268023^2 + 0.255365^2 + \ldots + 0.292430^2}\right)\left(\sqrt{0.525217^2 + 0.529302^2 + \ldots + 0.383419^2}\right)}\right]$$

$$W = \cos^{-1}(0.984005) = 10.26143881°$$

Similarly, the cloud spectrum selection unit 13 calculates a spectral angle for all clouds, such as:
cloud 2: W=9.0275470178°,
cloud 3: W=9.027547178°, . . . ,
cloud N: W=1.747962509°

Since the calculation result shows that $P_{11}$ has the smallest angle with the cloud N, the cloud spectrum selection unit 13 determines that $P_{11}$ is contaminated by the cloud N and the cloud N is selected for unmixing of $P_{11}$.

After the cloud spectrum selection unit 13 selects a cloud spectrum corresponding to all pixels, the output is as shown in FIG. 7. The figures in the table indicates indices of selected cloud No. for each pixel in FIG. 5.

In step S102, the endmember extraction unit 14 extracts spectra of endmembers other than clouds from the input image. The number of the extracted spectra is equal to the number specified by the receiving unit 12.

In step S103, the unmixing unit 15 unmixes each pixels in the input image pixel to give a fractional abundance of clouds (g) in the respective pixels.

In step S104, the thresholding unit 16, compares an abundance of a cloud (g) with a threshold for each pixels in the image.

In step S105, the thick cloud masking unit 17 masks out a pixel for which abundance of a cloud (g) is greater than or equal to the threshold as a thick cloud.

In step S106, the thin cloud correction unit 18 performs a correction for a pixel according to equation (10), if an abundance of a cloud for the pixel is less than the threshold. For example, for the pixel $P_{11}$ in FIG. 5, the contaminating cloud is N as shown in FIG. 7. Suppose the threshold for the thresholding unit 16 is 0.9. If for the pixel $P_{11}$, the unmixing unit 15 outputs a fractional abundance of a cloud as 0.6, since the abundance of a cloud is less than the threshold, the thresholding unit 16 sends this pixel to the thin cloud correction unit 18. The thin cloud correction unit 18 performs the correction to get the true ground reflectance r using spectral values of cloud N in FIG. 2, g and spectral values of the pixel $P_{11}$ in FIG. 6 as shown below:

$$r = \frac{1}{(1.06)} \left( \begin{bmatrix} 0.525217 \\ 0.529302 \\ 0.516074 \\ 0.544729 \\ 0.644331 \\ 0.512398 \\ 0.383419 \end{bmatrix} - (0.6) \begin{bmatrix} 0.465346 \\ 0.467995 \\ 0.445105 \\ 0.468594 \\ 0.575583 \\ 0.468904 \\ 0.369260 \end{bmatrix} \right)$$

$$r = \begin{bmatrix} 0.615024 \\ 0.621263 \\ 0.622528 \\ 0.658932 \\ 0.747453 \\ 0.577639 \\ 0.404658 \end{bmatrix}$$

Finally, in step S107, the output unit 19 outputs a combined image of masked out pixels which are covered by thick clouds and corrected pixels which are affected by thin clouds in the input image on a display. This is the end of the operation of the image processing device 100.

Effect of First Example Embodiment

The image processing device 100 of first example embodiment in accordance with the present invention, can accurately detect areas affected by clouds and correct effects of the clouds even if multiple types or layers of clouds are present in images. The reason is that the cloud spectrum selection unit 13 selects a cloud spectrum for unmixing among multiple cloud spectra by referring to the cloud spectra memory 11. In the first example embodiment, the thresholding unit 16 can overcome the limitation of the strict constraint for detecting thick clouds such as g should be equal to 1. The thresholding unit 16 provides relaxation to the strict condition of thick cloud detection. Due to this, for a pixel with a thick cloud, even if an abundance of cloud is less than 1 and within its vicinity, the pixel will be marked as a thick cloud. As a result, the image processing device 100 can detect thick cloud cover with high accuracy and correct pixels affected by thin cloud more accurately in an input image.

Second Example Embodiment

In the First example embodiment, the image processing device 100 is capable of detecting areas affected by clouds and correcting effects of the clouds even if multiple types or layers of clouds are present in images by selecting a cloud spectrum from the cloud spectra memory 11. Here, the endmember extraction unit 14 extracts spectra of endmembers other than clouds from the whole image. This may take a longer time and consume a large amount of resources. In addition, there is a possibility that the endmember extraction unit 14 mistakenly selects a cloud spectrum several times. To avoid this, the image processing device preferably detects a portion which seems apparently cloudy, in other words, probably covered by clouds, in the input image, so as to get clear areas in the image before extracting spectra of endmembers. Then, the spectra of endmembers other than clouds can be extracted only from clear areas. In the Second example embodiment, an image processing device which can detect a probable cloud area in the input image will be described.

Image Processing Device

FIG. 8 is a block diagram showing the configuration of the image processing device 200 of the second example embodiment in accordance with the present invention. The image processing device 200 includes an input unit 10, a cloud spectra memory 11, a receiving unit 12, a cloud spectrum selection unit 13, a probable cloud area detection unit 21, an endmember extraction unit 14a, an unmixing unit 15, a thresholding unit 16, a thick cloud masking unit 17, a thin cloud correction unit 18, and an output unit 19.

The probable cloud area detection unit 21 acquires an input multispectral image from the input unit 10 and detects an area which is probably covered by clouds before the endmember extraction unit 14a determines spectra for endmembers other than cloud. A probable cloud area is the first estimate of a thick cloud cover in the input image.

A specific operation of the probable cloud area detection unit 21 in the second example embodiment is described below.

To determine a probable cloud area, spatial properties (properties based on a position and neighbourhood of a pixel in an image) of clouds can be used in addition to spectral properties. The neighbourhood (pixels) of a pixel is not limited to adjacent pixels, but includes certain areas of neighboring pixels. An area of the neighboring pixels depends on the size of a window which is one of subsets of an image in accordance with predetermined rule.

In an image, clouds are large flat areas of nearly same intensity levels (intensity level or gray level is relative intensity of a pixel as compared to white, corresponding to a digital number (a pixel value) recorded for a pixel in a band). To determine a probable cloud area, the probable cloud area detection unit 21 estimates the cloud cover in the image by using a spatial-spectral filter, which is based on spatial and spectral properties of a cloud. The filter employs a standard deviation and texture mean to quantize spatial and spectral properties and classify whether each of the pixels in the input image is a part of the probable cloud area or not.

The probable cloud area detection unit 21 can identify the intensity level flatness based on measures such as edges per unit length, spatial variance, texture. The probable cloud area detection unit 21 can design a filter to detect areas with no sudden change of intensity levels based on intensity level gradient values calculated by application of a filter function such as Prewitt, Sobel, Laplacian of Gaussian and the Canny edge detector, furthermore, standard deviation can be used as a measure of gradient. Most preferred measure to detect the probable cloud areas is a standard deviation of pixel intensity. For a pixel, standard deviation is calculated considering intensity values in its neighbourhood along with its own. The standard deviation of per pixel is a quantitative measure of how much an intensity of the pixel varies from the mean intensity value in its neighbourhood. The standard deviation is low in areas of constant intensity and high for features like edges in an image. How the standard deviation can be used to filter probable cloud pixels will be described later.

In addition, in an image, all pixels in an area covered by clouds have almost similar intensity levels. Therefore, cloud covered areas show specific patterns of intensity levels and homogeneous texture. Accordingly, the probable cloud area detection unit 21 can employ a filter of texture to detect probable cloud areas. Clouds show very high reflectance in visible, near infrared, short wave infrared wavelength bands. The cloud detection unit 21 can distinguish clouds by employing this property.

The probable cloud area detection unit 21 improves estimation of the cloud cover in the input image by employing filters of image shape and/or filters for specific land use based on spectral reflectance properties of particular land cover. The probable cloud area detection unit 21 can distinguish clouds by employing the spectral and spatial properties mentioned above. In addition, the probable cloud area detection unit 21 can employ a filter of shape to filter non-cloud areas. Unlike clouds, manmade objects have well defined regular shapes. The probable cloud area detection unit 21 can determine shapes of objects in the input image and removes objects with regular shapes from the probable cloud area.

In addition to filtering out regular shapes, the probable cloud area detection unit 21 can determine specific land cover classes in the images such as vegetation, snow, water, built up areas. The probable cloud area detection unit 21 can employ spectral indices for the determination. Some of examples of spectral indices, however not limited to, are normalised difference vegetation index, normalised difference snow index, normalised built-up index, normalised difference water index, normalised difference mud index, normalised burn ratio etc.

The probable cloud area detection unit 21 employs a combination of filters mentioned above to output a probable clouds area in the input image. The pixels within the obtained probable cloud area, which are probably affected by clouds, are removed from the input image and remaining pixels are sent to the endmember extraction unit 14a.

The endmember extraction unit 14a operates mostly the same as the endmember extraction unit 14, except it receives the number of endmembers from the receiving unit 12 and relatively clear non-cloud pixels as input.

Other units are the same as the first example embodiment.

Operation of Image Processing Device

FIG. 9 shows a flowchart which shows the operation of image processing device 200.

Inputs of step S200 are the same as those of step S100 in FIG. 4.

In step S201, the probable cloud area detection unit 21 detects a probable cloud area in the input image. The operation will be described in detail later.

In step S202, the obtained probable cloud area is removed from the input image to get relatively clear area(s) in the input image.

The operations of steps S203 to S209 are the same as those of steps S101 to S107 in FIG. 4, respectively.

In step S204, it should be noted that, an input is the relatively clear area(s) in the input image obtained from the step S202 unlike the whole image in step S102 in FIG. 4.

This is the end of the operation of the image processing device 200.

Next, the operation of the step S201 mentioned above will be described in detail. The FIG. 10 shows a flowchart of an operation in the step S201.

Firstly, in step S2010, the probable cloud area detection unit 21 receives the input multispectral image as an input. In step S2011, the probable cloud area detection unit 21 calculates a grayscale intensity image by calculating sum of each squared spectral value corresponding to each wavelength band of a pixel, for all pixels in the input image. A grayscale intensity image ($I_{mag}$) can be derived from an input multispectral image (I) as, $$I_{mag}(i, j) = \sum_{k=1}^{L} I^2(i, j, k) \qquad (12)$$

for $i = 1, \ldots, R$. $j = 1, \ldots, C$. ($k$ is a variable)

where L, R, C are numbers of wavelength band(s), row(s) and column(s) in the input image, respectively. Alternatively, since clouds affect wavelengths selectively, to calculate a grayscale intensity image, wavelength bands can be weighted differently or some bands can be excluded considering the effect of clouds for different wavelengths.

In step S2012, the probable cloud area detection unit 21 calculates standard deviation of pixels to detect areas covered by thick clouds only, by avoiding pixels (area) including cloud edges. A standard deviation of a pixel is a quantitative measure of how much an intensity of the pixel varies from the mean intensity value. From the grayscale intensity image, the probable cloud area detection unit 21 calculates a standard deviation for each pixel within a local window using equations (13) and (14), $$std(i, j) = \sqrt{\frac{1}{N_p} \sum_{l=1}^{N_p} (I_l - M_{ij})^2} \qquad (13)$$

$$M_{ij} = \frac{1}{N_p} \sum_{l=1}^{N_p} I_l \qquad (14)$$

where, std(i,j) is a standard deviation for a pixel (i,j) calculated within a window. The window consists of $N_p$ pixels [$I_1, \ldots, I_1$] which are in the neighbourhood of the pixel (i,j). $M_{ij}$ is an average intensity within the window calculated using equation (13).

In step S2013, the probable cloud area detection unit 21 calculates a texture measure to detect a probable cloud area. The probable cloud area detection unit 21 can design a filter to quantize the intensity level flatness of clouds based on texture. Texture of an image can be quantized by the Gray-Level Co-occurrence Matrix (GLCM). Different quantities can be derived from the GLCM such as entropy, contrast, variance and mean. The most preferred measure is a GLCM mean. From the grayscale intensity image, the probable cloud area detection unit 21 calculates a GLCM mean value of a pixel within a local window for all pixels in the image. The detailed description of the step S2013 follows next.

In the GLCM, the probable cloud area detection unit 21 generates the co-occurrence matrix whose elements are frequency $P_\delta$ (i, j), (i=0, 1, , . . . , Q−1, j=0, 1, , . . . , Q−1) of occurrence of intensity levels i and j in an image at a certain displacement δ=(r, θ). Q is the quantized intensity levels. r is a distance between i and j, θ is an orientation of the line ij with respect to horizontal axis. Feature values are calculated from the matrix, and feature information (such as texture) of the image is characterized by these values.

To determine the GLCM, quantization of input intensity levels is recommended to avoid sparse GLCM with many zeros. The quantization levels (Q) can vary from 2 to the intensity levels in the input image. The most preferred is 8-level quantization. i and j corresponds to the Q-level quantized intensity level in the image. From the GLCM, a GLCM mean ($G_{mean}$) is calculated using equation S2012)

$$G_{mean} = \sum_{i,j=0}^{Q-1} i \times P(i, j) \qquad (15)$$

where P(i,j) is a GLCM value for intensity levels. It indicates how often a pair of gray level i and gray level j has occurred in a particular orientation at a particular distance in the image. For example, element at (7, 2) in GLCM shows how many times 7 and 2 intensity levels have occurred together in the image.

For the orientation, it can be taken as a horizontal (0°), vertical (90°), diagonal1 (45°) or diagonal2 (135°). The most preferred orientation is horizontal (0°) with unit distance between gray levels. A $G_{mean}$ is calculated for each pixel in the image within a local window.

In step S2014, the probable cloud area detection unit 21 sets thresholds for GLCM mean and standard deviation for detecting areas possibly covered by clouds. A threshold for standard deviation (average of standard deviation, abbrev. "AVGSTD") can be taken as a standard deviation of whole image or can be calculated as, AVGSTD=max (std of all pixels)−$K_c$×range (std of all pixels), (16)

where $K_c$ is a constant in the range [0, 1].

A threshold for GLCM mean can be selected as an average of GLCM mean values (abbrev. "AVGMEAN") for all pixels or alternatively as, AVGMEAN=max (GLCM mean)−$K_m$×range (GLCM mean), (17)

where $K_m$ is a constant in the range [0, 1].

The default value for $K_m$ and $K_c$ can be kept as 0.5. Alternatively, these can be set by an operator for fine tuning.

Next, operations from steps S2015 to S2016 are repeated for each of all pixels in the input image (∀ pixel).

In step S2015, the probable cloud area detection unit 21 filters probable cloudy pixels from other objects in the image based on thresholds which are set in the step S2014. The steps S2014 and S2015 form a filter for the probable cloud area detection. Operation for this filter is described below.

To filter the probable cloudy pixels, the standard deviation can be used. The filter of standard deviation is based on an assumption that pixels covered by clouds will have low standard deviation due to wide spread cloud areas with nearly similar intensity levels. If a standard deviation of a pixel is smaller than the threshold (standard deviation<threshold "AVGSTD"), the pixel may belong to large areas of constant intensity levels. Therefore, it can be a cloud pixel which is present at the cloud area. The filter of standard deviation also helps to eliminate some brighter objects such as sand on sea shore and small rooftops.

A frequent occurrence of two intensity levels in a particular orientation at particular distance gives a high element value in the GLCM. It indicates a particular pattern of intensity levels. A mean value of the GLCM weights the GLCM value with a respective intensity level. Clouds show high reflectance in visible, near infrared, short wave infrared bands, so clouds appear very bright in a grayscale intensity image. In addition, a cloud cover tends to be a large continuous area in an image. Therefore, frequency of occurrence of gray level of clouds in particular orientation at particular distance will be high.

Due to these properties, clouds show brighter appearance in the image of a GLCM mean. A cloud area can be identified by thresholding the GLCM mean image so as to get areas with high GLCM mean values. If a GLCM mean of a pixel is greater than the threshold (GLCM mean>threshold "AVGMEAN"), the pixel may belong to large areas of constant gray levels.

Therefore, by using thresholds set in the step S2014, in step S2015, the probable cloud area detection unit 21 marks pixels with standard deviation less than the threshold and GLCM mean greater than the threshold as probable cloud pixels.

In step S2016, when a pixel is determined as covered by a thick cloud if it has a standard deviation smaller than the threshold or a GLCM mean greater than the threshold, the probable cloud area detection unit 21 adds the pixel to a probable cloud area. While, the pixel is not determined as covered by a thick cloud if it has a standard deviation greater than or equal the threshold or a GLCM mean less than or equal the threshold. Then, the pixel will not be included in the probable cloud area, and the operation is returned to S2015 until all pixels complete steps S2015 and S2016.

In step S2017, the probable cloud area detection unit 21 removes small isolated areas from the pixel areas marked as the probable cloud pixels. It can be processed considering 8-connectivity of pixels. The probable cloud area detection unit 21 outputs a probable cloud area.

The explanation of a specific operation of the probable cloud area detection unit 21 and the step S201 in FIG. 9 ends here.

Effect of Second Example Embodiment

The second example embodiment has an effect of the first example embodiment and further advantageous effect than the first example embodiment. If the complete image including cloudy areas is an input to the endmember extraction unit 14 as in the first example embodiment, some additional cloud spectra can be extracted and then the subsequent process in the unmixing unit 15 may get confused by those cloud spectra in calculating the fractional abundance of the cloud selected by the cloud spectrum selection unit 13. Moreover, using whole image, such as in NPL1, may take a longer time and use a large amount of resources to extract spectra of endmembers other than clouds from an entire image containing a cloud cover. In the second example embodiment, the endmember extraction unit 14 accepts only a non-cloudy area as an input and then no additional cloud spectra will get extracted because pure pixel of cloud will not be present in the non-cloudy area. The subsequent unmixing process can therefore estimate the fractional abundance of the cloud more accurately. Thus, detecting a thick cloud cover and correcting pixels affected by thin clouds can be performed more accurately.

Third Example Embodiment

In the First and Second example embodiments, the image processing devices 100 and 200 can detect thick clouds and correct pixels affected by thin clouds in the input image. However, a cloud spectrum selected from the cloud spectra memory 11 may not match exactly with the spectrum present in the image. This is due to wide variety in cloud spectra and change in atmospheric conditions. It is possible that an actual cloud spectra present in the input image might not be present in the cloud spectra memory 11. In the third example embodiment, an image processing device which can extract cloud spectra from the input image itself is described.

Image Processing Server

FIG. 11 is a block diagram showing the configuration of the image processing device 300 of the third example embodiment in accordance with the present invention. The image processing device 300 includes an input unit 10, a receiving unit 12, a probable cloud area detection unit 21, a cloud spectra extraction unit 31, a cloud spectrum selection unit 13, an endmember extraction unit 14, an unmixing unit 15, a thresholding unit 16, a thick cloud masking unit 17, a thin cloud correction unit 18 and an output unit 19.

The operation of the receiving unit 12 is almost the same as explained in the first example embodiment except an additional input. The receiving unit 12 receives the number of different cloud spectra in the image from an operator. The receiving unit 12 sends the number of different cloud spectra to the cloud spectra extraction unit 31.

The cloud spectra extraction unit 31 extracts cloud spectra present in the image before the cloud spectrum selection unit 13 selects a cloud spectrum for each pixel.

The cloud spectra extraction unit 31 acquires a multispectral image from the input unit 10 and the number of different spectra of clouds present in the image from the receiving unit 12. The cloud spectra extraction unit 31 finds clusters of cloudy pixels equal to the number of clouds which differs from each other. Each cluster corresponds to one type of cloud. The cloud spectra extraction unit 31 derives cloud spectra from respective clusters. The cloud spectra extraction unit 31 can determine clusters of cloudy pixels based on GLCM mean values and a property that pixels belonging to the same type of cloud show approximately the same GLCM mean values.

Alternatively, the cloud spectra extraction unit 31 can find pixels (areas) covered by clouds only and perform unsupervised unmixing to get cluster of different types of clouds within the area covered by clouds. The unsupervised unmixing can be done with well-known algorithms such as k-means clustering, mean shift clustering, isodata algorithm and DBSCAN (Density-based spatial clustering of applications with noise).

Other units are the same as those in the first and second example embodiments.

Operation of Image Processing Device

FIG. 12 shows a flowchart which shows the operation of image processing device 300.

In step S300, a multispectral image is input.

The operation of step S301 is the same as that of step S201 (step S2010 to S2018) in FIG. 9.

The operation of step S302 is the same as that of step S202 in FIG. 9.

In step S303, the cloud spectra extraction unit 31 extracts spectra of clouds present in the input image. The operation will be described in detail later.

The operations of steps S304 to S310 are the same as those of steps S101 to S107 in FIG. 4, respectively.

Next, the operation of the step S303 mentioned above will be described in detail. FIG. 13 shows a flowchart of the operation in the step S303.

In step S3030, the cloud spectra extraction unit 31 receives an input multispectral image from the input unit 10 and the number of different clouds ($N_c$) present in the image from the receiving unit 12. To find different cloud spectra in the image, first clusters of pixels of clouds equal to the specified number of clouds $N_c$ are determined such that different clusters correspond to different types or layers of clouds. Cloud spectra can be extracted from respective clusters.

The operations of steps S3031 and S3032 are the same as those of steps S2011 and S2013 in FIG. 10, respectively.

In step S3033, the cloud spectra extraction unit 31 scales the GLCM mean of each pixel in an image to an integer ranging from 0 to 255 (8-bit). The scaling to 8-bit integers is just an example, and the GLCM mean image can be processed even without scaling or by scaling to other ranges.

In step S3034, the cloud spectra extraction unit 31 extracts the cloud spectra present in the input image by deriving a histogram of a GLCM mean values of the input image; detecting peaks in the histogram; forming clusters of the one or more clouds present in the input image based on the peaks in the histogram of GLCM mean values; and deriving the spectra of the one or more clouds present in the input image as a set of representative spectra, each of which is obtained from each of the clusters. More specifically, the cloud spectra extraction unit 31 derives a histogram from the scaled GLCM mean image. A GLCM mean weights a texture measure with a gray level. Therefore, even though all cloudy areas will have similar texture, if they have different gray levels, they will show different magnitude levels of GLCM mean. Since clouds have large areas, large number of pixels will show similar GLCM mean values. This property can be quantized using a histogram.

In step S3035, the cloud spectra extraction unit 31 calculates peakiness for each gray level in histogram. The large number of pixels having similar gray level shows peaks in a histogram. Therefore, peaks in a histogram of a GLCM mean image define clusters in the image. Different types or layers of clouds in an image will show different peaks in a histogram of a GLCM mean image because of different GLCM mean magnitudes. Local maxima (peaks) in a histogram can be determined based on a peakiness measure given by equation (18).

$$\text{Peakiness} = \left(1 - \frac{V_a + V_b}{2P}\right)\left(1 - \frac{1}{Q \times P}\right) \quad (18)$$

Where "$V_a$" is a height of the nearest valley before the peak, "$V_b$" is a height of the nearest valley after the peak, P is a height of the peak, Q is a spread of the peak, which is taken as a distance between adjacent valleys of the peak. In the context of given problem, a histogram of a GLCM mean image is sparse with zeros for many gray levels. Therefore, for calculating peakiness, adjacent non-zero valleys are considered. In step S3035, the cloud spectra extraction unit 31 calculates peakiness for all gray levels.

In the step S3036, the cloud spectra extraction unit 31 determines local maxima (peaks) in the histogram based on a threshold. Gray levels which have peakiness greater than the predetermined threshold are considered as local maxima (peaks) in the histogram.

In the step S3037, the cloud spectra extraction unit 31 determines seeds of clouds, which are gray levels in GLCM mean image corresponding to clouds. As described in the second example embodiment, clouds show higher magnitudes of GLCM mean than other objects in the image. Therefore, peaks in higher intensity level range in the histogram of GLCM mean probably correspond to pixels belonging to clouds. In step S3037, starting from the highest GLCM mean level in the histogram, first $N_c$ GLCM mean levels corresponding to peaks are taken as center GLCM mean levels which correspond to different types or layers of clouds. These GLCM mean levels are called as seeds of clouds in the present example embodiment.

In step S3038, all pixels with GLCM mean magnitude equal to a seed GLCM mean level are marked as core cloud pixels. Core pixels form a cluster of a cloudy pixels corresponding to the seed. Different cloud clusters are defined by identifying core pixels corresponding to all seed GLCM mean levels.

In step S3039, the cloud spectra extraction unit 31 derives cloud spectra from the clusters of different clouds. Some of plausible ways to derive cloud spectra from clusters are:
  i. An average spectrum of a cluster;
  ii. A spectrum of the brightest pixel in a cluster; or
  iii. An average of top few bright pixels in a cluster.

In step S3040, the cloud spectra extraction unit 31 outputs the spectra of clouds present in the input image and sends them to the cloud spectrum selection unit 13.

The explanation of a specific operation of the cloud spectra extraction unit 31 and step S303 in FIG. 12 ends here.

Effect of Third Example Embodiment

The third example embodiment in accordance with the present invention has an effect of the first and second example embodiment and further advantageous effect than the first example embodiment. The image processing device 300 of the third example embodiment extracts different cloud spectra from the image itself instead of using spectra from a database or memory of cloud spectra. By extracting cloud spectra from the input image gives better estimation of cloud spectra because every image is affected by environmental conditions, capturing geometry and sun elevation differently. Therefore, spectra in a database may not match perfectly with the actual cloud spectra in the input image. This limitation is removed by extracting cloud spectra from the input image itself. Thus, the cloud spectra extraction unit 31 gives more accurate cloud spectrum thereby increasing the detection and correction accuracy of pixels covered by clouds.

Fourth Example Embodiment

In the first to third example embodiments, the image processing devices 100, 200 and 300 can detect thick clouds and correct pixels affected by thin clouds in the input image even if the input image contains multiple types or layers of clouds. In the third example embodiment, the image processing device 300 extracts spectra of clouds present in an input image from the input image itself. However, it cannot determine the number of types or layers of clouds in the image automatically. In the fourth example embodiment, an image processing device which derives the number of types or layers of clouds in the input image is described.

Image Processing Device

FIG. 14 is a block diagram showing the configuration of the image processing device 400 of the fourth example embodiment in accordance with the present invention. The image processing device 400 includes an input unit 10, a receiving unit 12, a probable cloud area detection unit 21, a cloud spectra extraction unit 31a, a cloud types counting unit 41, a cloud spectrum selection unit 13, an endmember extraction unit 14a, an unmixing unit 15, a thresholding unit 16, a thick cloud masking unit 17, a thin cloud correction unit 18 and an output unit 19.

The cloud types counting unit 41 counts the number of the cloud spectra present in the input image. The cloud types counting unit 41 determines the number of significant cloud types or layers in the input image automatically from the input image itself.

The cloud types counting unit 41 acquires a probable cloud area and a GLCM mean image from the probable cloud area detection unit 21. A number of local maxima (peaks) in a histogram of GLCM mean image of pixels in the probable cloud area can give an estimation of the number of types of clouds in the input image.

The cloud spectra extraction unit 31a operates mostly the same as the cloud spectra extraction unit 31 except it extracts at least one of the spectra of the one or more clouds present in the input image from the input image based on the counted number of the cloud spectra present in the input image.

Other units are the same as those in the first to third example embodiments.

Operation of Image Processing Device

FIG. 15 shows a flowchart which shows the operation of the image processing device 400.

The operation of step S400 is the same as that of step S300 in FIG. 12.

The operation of step S401 is the same as that of step S201 (S2010 to S2018) in FIG. 9.

In step S402, the cloud types counting unit 41 determines the number of significant types or layers of clouds in the input image. The operation will be described in detail later.

In step S403, the operation is similar to the step S302 (S3030 to S3040) in FIG. 12 except the cloud spectra extraction unit 31a acquires the number of cloud types from the cloud types counting unit 41.

The operation of step S404 is the same as that of step S202 in FIG. 9.

The operations of steps S405 to S411 are the same as those of steps S101 to S107 in FIG. 4, respectively.

This is the end of the operation of the image processing device 400.

Next, the step S402 operated by the cloud types counting unit 41 mentioned above will be described in detail. FIG. 16 shows detailed flow chart of the step S402 in FIG. 15.

In step S4020, the cloud types counting unit 41 receives, the GLCM mean of the input image and a probable cloud area as inputs from the probable cloud area detection unit 21.

In steps S4021, the operation is the same as step S3033 in FIG. 13.

In step S4022, the cloud types counting unit 41 derives a histogram of the scaled GLCM mean image using pixels in the probable clouds area only. Since, following the explanation in the second to fourth example embodiments, the probable cloud area has pixels affected by cloud only, and therefore, peaks in this histogram correspond to different types or layers of clouds. Therefore, the number of peaks in the histogram of the scaled GLCM mean for pixels in the probable cloud area gives the number of types or layers of clouds present in the input image.

The operation of step S4023 is the same as that of step S3035 in FIG. 13.

In step S4024, the cloud types counting unit 41 counts the number of gray levels for which peakiness is greater than a threshold.

In step S4025, the count is accepted as the number of types or layers of clouds in the input image.

In step S4026, the cloud types counting unit 41 sends this count to the cloud spectra extraction unit 31.

The explanation of a specific operation of the cloud types counting unit 41 and the step S402 in FIG. 15 ends here.

Effect of Fourth Example Embodiment

In the fourth example embodiment, the number of different types or layers of clouds in an image is determined automatically unlike the manual input in the third example embodiment. In the case of manual input, there is a possibility that if difference between two cloud types is subtle, manual counting of cloud types in the image is inaccurate. This limitation is overcome by the automatic determination of the number of types of clouds in the fourth example embodiment, thereby improving accuracy of detection and correction of pixels affected by clouds is provided.

Fifth Example Embodiment

An image processing device 500 of the fifth example embodiment in accordance with the present invention includes a minimum configuration of the image processing devices according to the first to fourth example embodiments.

FIG. 17 is a block diagram showing the configuration of the image processing device 500 of the fifth example embodiment in accordance with the present invention. The image processing device 500 includes a cloud spectrum selection unit 501, an endmember extraction unit 502, and an unmixing unit 503.

The cloud spectrum selection unit 501 selects at least one spectrum for each of pixels from spectra of one or more clouds present in an input image.

The endmember extraction unit 502 extracts spectra of one or more endmembers other than the one or more clouds from the input image.

The unmixing unit 503 derives fractional abundances of the respective spectra of one or more endmembers and the selected spectrum of one of the one or more clouds for the each of pixels in the input image.

The image processing device 500 of the fifth example embodiment can provide a technique capable of accurately detecting areas affected by clouds and correcting effects of the clouds even if multiple types or layers of clouds are present in images. The reason is that the cloud spectrum selection unit 501 selects at least one spectrum for each of pixels from spectra of one or more clouds present in an input image, that the endmember extraction unit 502 extracts spectra of one or more endmembers from the input image and that the unmixing unit 503 derives fractional abundances of the respective spectra of one or more endmembers and the selected spectrum of one of the one or more clouds for the each of pixels.

Configuration of Information Processing Apparatus

FIG. 18 illustrates, by way of example, a configuration of an information processing apparatus 900 (computer) which can implement an image processing device relevant to an example embodiment of the present invention. In other words, FIG. 18 illustrates a configuration of a computer (information processing apparatus) capable of implementing the devices in FIGS. 1,8,11 and 14, representing a hardware environment where the individual functions in the above-described example embodiments can be implemented.

The information processing apparatus 900 illustrated in FIG. 18 includes the following as components:
CPU 901 (Central_Processing_Unit);
ROM 902 (Read_Only_Memory);
RAM 903 (Random_Access_Memory);
Hard disk 904 (storage device);
Communication interface to an external device 905;
Reader/writer 908 capable of reading and writing data stored in a storage medium 907 such as CD-ROM (Compact_Disc_Read_Only_Memory); and
Input/output interface 909.

The information processing apparatus 900 is a general computer where these components are connected via a bus 906 (communication line).

The present invention explained with the above-described example embodiments as examples is accomplished by providing the information processing apparatus 900 illustrated in FIG. 18 with a computer program which is capable of implementing the functions illustrated in the block diagrams (FIGS. 1,8,11 and 14) or the flowcharts (FIGS. 4,9,10,12,13,15 and 16) referenced in the explanation of these example embodiments, and then by reading the computer program into the CPU 901 in such hardware, interpreting it, and executing it. The computer program provided to the apparatus can be stored in a volatile readable and writable storage memory (RAM 903) or in a non-volatile storage device such as the hard disk 904.

In addition, in the case described above, general procedures can now be used to provide the computer program to such hardware. These procedures include, for example, installing the computer program into the apparatus via any of various storage medium 907 such as CD-ROM, or downloading it from an external source via communication lines such as the Internet. In these cases, the present invention can be seen as being composed of codes forming such computer program or being composed of the storage medium 907 storing the codes.

The whole or part of the above-described example embodiments can be described as, but not limited to, the following supplementary notes.

(Supplementary Note 1) An image processing device for detection and correction of a cloud cover, comprising:
a cloud spectrum selection means for selecting at least one spectrum for each of pixels from spectra of one or more clouds present in an input image;
an endmember extraction means for extracting spectra of one or more endmembers other than the one or more clouds from those of the input image; and
an unmixing means for deriving fractional abundances of the respective spectra of one or more endmembers and a selected spectrum of one of the one or more clouds for the each of pixels in the input image.

(Supplementary Note 2) The image processing device according to Supplementary Note 1, further comprising:
a thresholding means for comparing the fractional abundance of the selected spectrum of one of the one or more clouds with a specific threshold and classifying the each of pixels as a thick cloud or a thin cloud.

(Supplementary Note 3) The image processing device according to Supplementary Note 1 or 2, further comprising:
a probable cloud area detection mean for detecting a probable cloud cover in the input image,
wherein the endmember extraction means extracts the one or more endmembers from an area which is not detected as the probable cloud area.

(Supplementary Note 4) The image processing device according to any one of Supplementary Notes 1 to 3, further comprising:

a cloud spectra memory for storing a plurality of spectra of one or more clouds possibly observed in the input image, wherein the cloud spectrum selection means selects at least one spectrum of the one or more clouds from the spectra in the cloud spectra memory.

(Supplementary Note 5) The image processing device according to any one of Supplementary Notes 1 to 3, further comprising:

a cloud spectrum extraction means for extracting at least one of the spectra of the one or more clouds present in the input image from the input image, wherein the cloud spectrum selection means selects at least one spectrum from cloud spectra, the cloud spectra being one of the spectra of the one or more clouds extracted.

(Supplementary Note 6) The image processing device according to Supplementary Note 3, wherein the probable cloud area detection means estimates the cloud cover in the input image by employing a spatial-spectral filter of standard deviation and texture mean to classify the each of pixels in the input image as a part of the probable cloud area or not.

(Supplementary Note 7) The image processing device according to Supplementary Note 4, further comprising:

a cloud types counting means for counting number of the cloud spectra present in the input image, wherein the cloud spectra extraction means extracts at least one of the spectra of the one or more clouds present in the input image from the input image based on the number of the cloud spectra present in the input image, which is counted by the cloud types counting means.

(Supplementary Note 8) The image processing device according to Supplementary Note 5, wherein the cloud spectra extraction means extracts the cloud spectra present in the input image by:

deriving a histogram of a GLCM mean image of the input image only for the probable cloud area, detecting peaks in the histogram, forming clusters of the one or more clouds present in the input image based on the peaks in the histogram of GLCM mean of the probable cloud area, and deriving the spectra of the one or more clouds resent in the input image as a set of representative spectra, each of which is obtained from each of the clusters.

(Supplementary Note 9) The image processing device according to Supplementary Note 2, further comprising:

a thick cloud masking means for masking out pixels covered by the thick cloud, a thin cloud correction means for correcting the thin cloud based on the fractional abundances for each of pixels covered by the thin cloud.

(Supplementary Note 10) The image processing device according to Supplementary Note 3 or Supplementary Note 6, wherein the probable cloud area detection means improves estimation of the cloud cover in the input image by employing a filter of shape and filters for specific land use based on spectral indices.

(Supplementary Note 11) The image processing device according to any one of Supplementary Notes 3, 6 and 10, wherein the probable cloud area detection means derives a grayscale intensity image for estimating the probable cloud cover by weighting each of wavelength bands in the input image or by excluding one or more wavelength bands.

(Supplementary Note 12) An image processing method for detection and correction of a cloud cover, comprising:

selecting at least one spectrum for each of pixels from spectra of one or more clouds present in an input image;

extracting spectra of one or more endmembers other than the one or more clouds from those of the input image; and deriving fractional abundances of the respective spectra of one or more endmembers and a selected spectrum of one of the one or more clouds for the each of pixels in the input image.

(Supplementary Note 13) The method according to Supplementary Note 12, further comprising:

comparing the fractional abundance of the selected spectrum of one of the one or more clouds with a specific threshold and classifying the each of pixels as a thick cloud or a thin cloud.

(Supplementary Note 14) The method according to Supplementary Note 12 or 13, further comprising:

detecting a probable cloud cover in the input image, wherein the extracting spectra of one or more endmembers includes extracting the one or more endmembers from an area which is not detected as the probable cloud area.

(Supplementary Note 15) The method according to any one of Supplementary Notes 12 to 14, wherein the selecting at least one spectrum for each of pixels includes selecting at least one spectrum of the one or more clouds from the spectra in the cloud spectra memory storing a plurality of spectra of one or more clouds possibly observed in the input image.

(Supplementary Note 16) The method according to any one of Supplementary Notes 12 to 14, further comprising:

extracting at least one of the spectra of the one or more clouds present in the input image from the input image, wherein the selecting at least one spectrum for each of pixels includes selecting at least one spectrum from cloud spectra, the cloud spectra being one of the spectra of the one or more clouds extracted.

(Supplementary Note 17) The method according to Supplementary Note 14, wherein the detecting the probable cloud cover includes estimating the cloud cover in the input image by employing a spatial-spectral filter of standard deviation and texture mean to classify the each of pixels in the input image as a part of the probable cloud area or not.

(Supplementary Note 18) The method according to Supplementary Note 15, further comprising:

counting number of the cloud spectra present in the input image, wherein the extracting at least one of the spectra of the one or more clouds includes extracting at least one of the spectra of the one or more clouds present in the input image from the input image based on the number of the cloud spectra present in the input image, which is counted in the counting number of the cloud spectra.

(Supplementary Note 19) The method according to Supplementary Note 16, wherein the extracting at least one of the spectra of the one or more clouds includes extracting the cloud spectra present in the input image by:

deriving a histogram of a GLCM mean image of the input image only for the probable cloud area, detecting peaks in the histogram, forming clusters of the one or more clouds present in the input image based on the peaks in the histogram of GLCM mean of the probable cloud area, and deriving the spectra of the one or more clouds resent in the input image as a set of representative spectra, each of which is obtained from each of the clusters.

(Supplementary Note 20) The method according to Supplementary Note 13, further comprising:

masking out pixels covered by the thick cloud, correcting the thin cloud based on the fractional abundances for each of pixels covered by the thin cloud.

(Supplementary Note 21) The method according to Supplementary Note 14 or Supplementary Note 17, wherein, the detecting the probable cloud cover includes improving estimation of the cloud cover in the input image by employing a filter of shape and filters for specific land use based on spectral indices.

(Supplementary Note 22) The method according to any one of Supplementary Notes 14, 17 and 21, wherein the detecting the probable cloud cover includes deriving a grayscale intensity image for estimating the probable cloud cover by weighting each of wavelength bands in the input image or by excluding one or more wavelength bands.

(Supplementary Note 23) A storage medium which stores image processing program to cause a computer for detection and correction of a cloud cover, the program comprising:

selecting at least one spectrum for each of pixels from spectra of one or more clouds present in an input image;

extracting spectra of one or more endmembers other than the one or more clouds from those of the input image; and deriving fractional abundances of the respective spectra of one or more endmembers and a selected spectrum of one of the one or more clouds for the each of pixels in the input image.

(Supplementary Note 24) The storage medium according to Supplementary Note 23, the program further comprising:

comparing the fractional abundance of the selected spectrum of one of the one or more clouds with a specific threshold and classifying the each of pixels as a thick cloud or a thin cloud.

(Supplementary Note 25) The storage medium according to Supplementary Note 23 or 24, the program further comprising:

detecting a probable cloud cover in the input image, wherein the extracting spectra of one or more endmembers includes extracting the one or more endmembers from an area which is not detected as the probable cloud area.

(Supplementary Note 26) The storage medium according to any one of Supplementary Notes 23 to 25, wherein the selecting at least one spectrum for each of pixels includes selecting at least one spectrum of the one or more clouds from the spectra in the cloud spectra memory storing a plurality of spectra of one or more clouds possibly observed in the input image.

(Supplementary Note 27) The storage medium according to any one of Supplementary Notes 23 to 25, the program further comprising:

extracting at least one of the spectra of the one or more clouds present in the input image from the input image, wherein the selecting at least one spectrum for each of pixels includes selecting at least one spectrum from cloud spectra, the cloud spectra being one of the spectra of the one or more clouds extracted.

(Supplementary Note 28) The storage medium according to Supplementary Note 25, wherein the detecting the probable cloud cover includes estimating the cloud cover in the input image by employing a spatial-spectral filter of standard deviation and texture mean to classify the each of pixels in the input image as a part of the probable cloud area or not.

(Supplementary Note 29) The storage medium according to Supplementary Note 26, the program further comprising:

counting number of the cloud spectra present in the input image, wherein the extracting at least one of the spectra of the one or more clouds includes extracting at least one of the spectra of the one or more clouds present in the input image from the input image based on the number of the cloud spectra present in the input image, which is counted in the counting number of the cloud spectra.

(Supplementary Note 30) The storage medium according to Supplementary Note 27, wherein the extracting at least one of the spectra of the one or more clouds includes extracting the cloud spectra present in the input image by:

deriving a histogram of a GLCM mean image of the input image only for the probable cloud area, detecting peaks in the histogram, forming clusters of the one or more clouds present in the input image based on the peaks in the histogram of GLCM mean of the probable cloud area, and deriving the spectra of the one or more clouds resent in the input image as a set of representative spectra, each of which is obtained from each of the clusters.

(Supplementary Note 31) The storage medium according to Supplementary Note 24, the program further comprising:

masking out pixels covered by the thick cloud, correcting the thin cloud based on the fractional abundances for each of pixels covered by the thin cloud.

(Supplementary Note 32) The storage medium according to Supplementary Note 25 or Supplementary Note 28, wherein the detecting the probable cloud cover includes improving estimation of the cloud cover in the input image by employing a filter of shape and filters for specific land use based on spectral indices.

(Supplementary Note 33) The storage medium according to any one of Supplementary Notes 25, 28 and 32, wherein the detecting the probable cloud cover includes deriving a grayscale intensity image for estimating the probable cloud cover by weighting each of wavelength bands in the input image or by excluding one or more wavelength bands.

The previous description of the example embodiments is provided to enable a person skilled in the art to make and use the present invention. Moreover, various modifications to these example embodiments will be readily apparent to those skilled in the art, and the generic principles and specific examples defined herein may be applied to other example embodiments without the use of inventive faculty. Therefore, the present invention is not intended to be limited to the example embodiments described herein but is to be accorded the widest scope as defined by the limitations of the claims and equivalents. Further, it is noted that the inventor's intent is to retain all equivalents of the claimed invention even if the claims are amended during prosecution.

INDUSTRIAL APPLICABILITY

The present invention can be applied as a preprocessing tool for compensating environmental effects in capturing of satellite images before advance level satellite image processing operations.

REFERENCE SIGNS LIST

01: input unit
02: receiving unit
03: cloud spectrum extraction unit
04: endmember extraction unit
05: unmixing unit
06: thin cloud correction unit
07: output unit
10: input unit
11: cloud spectra memory
12: receiving unit
13: cloud spectrum selection unit
14,14a: endmember extraction unit
15: unmixing unit
16: thresholding unit
17: thick cloud masking unit
18: thin cloud correction unit
19: output unit
21: probable cloud area detection unit
31,31a : cloud spectra extraction unit
41: cloud types counting unit
100: image processing device
200: image processing device
300: image processing device
400: image processing device
900: information processing apparatus
901: CPU
902: ROM
903: RAM
904: hard disk
905: communication interface
906: bus
907: storage medium
908: reader/writer
909: input/output interface

What is claimed is:

1. An image processing device for detection and correction of a cloud cover, comprising:
   a memory, and
   one or more processors functioning as:
   a cloud spectrum selection unit configured to select at least one spectrum for each of pixels from spectra of one or more clouds present in an input image;
   an endmember extraction unit configured to extract spectra of one or more endmembers other than the one or more clouds from those of the input image;
   an unmixing unit configured to derive fractional abundances of the respective spectra of one or more endmembers and a selected spectrum of one of the one or more clouds for the each of pixels in the input image; and
   a cloud spectrum extraction unit configured to extract at least one of the spectra of the one or more clouds present in the input image from the input image,
   wherein the cloud spectrum selection unit selects at least one spectrum from cloud spectra, the cloud spectra being one of the spectra of the one or more clouds extracted, and
   wherein the cloud spectra extraction unit extracts the cloud spectra present in the input image by:
      deriving a histogram of a GLCM mean image of the input image only for the probable cloud area,
      detecting peaks in the histogram,
      forming clusters of the one or more clouds present in the input image based on the peaks in the histogram of GLCM mean of the probable cloud area, and
      deriving the spectra of the one or more clouds resent in the input image as a set of representative spectra, each of which is obtained from each of the clusters.

2. The image processing device according to claim 1, further comprising:
   a thresholding unit configured to compare the fractional abundance of the selected spectrum of one of the one or more clouds with a specific threshold and classify the each of pixels as a thick cloud or a thin cloud.

3. The image processing device according to claim 2, further comprising:
   a thick cloud masking unit configured to mask out pixels covered by the thick cloud,
   a thin cloud correction unit configured to correct the thin cloud based on the fractional abundances for each of pixels covered by the thin cloud.

4. The image processing device according to claim 2, further comprising:
   a probable cloud area detection unit configured to detect a probable cloud cover in the input image,
   wherein the endmember extraction unit extract the one or more endmembers from an area which is not detected as the probable cloud area.

5. The image processing device according to claim 2, further comprising:
   a cloud spectra memory for storing a plurality of spectra of one or more clouds possibly observed in the input image,
   wherein the cloud spectrum selection unit selects at least one spectrum of the one or more clouds from the spectra in the cloud spectra memory.

6. The image processing device according to claim 2, further comprising:
   a cloud spectrum extraction unit configured to extract at least one of the spectra of the one or more clouds present in the input image from the input image,
   wherein the cloud spectrum selection unit selects at least one spectrum from cloud spectra, the cloud spectra being one of the spectra of the one or more clouds extracted.

7. The image processing device according to claim 1, further comprising:
   a probable cloud area detection unit configured to detect a probable cloud cover in the input image,
   wherein the endmember extraction unit extracts the one or more endmembers from an area which is not detected as the probable cloud area.

8. The image processing device according to claim 7, wherein the probable cloud area detection unit estimates the cloud cover in the input image by employing a spatial-spectral filter of standard deviation and texture mean to classify the each of pixels in the input image as a part of the probable cloud area or not.

9. The image processing device according to claim 7, wherein the probable cloud area detection unit improves estimation of the cloud cover in the input image by employing a filter of shape and filters for specific land use based on spectral indices.

10. The image processing device according to claim 7, wherein the probable cloud area detection unit derives a grayscale intensity image for estimating the probable cloud cover by weighting each of wavelength bands in the input image or by excluding one or more wavelength bands.

11. The image processing device according to claim 7, further comprising:
a cloud spectra memory for storing a plurality of spectra of one or more clouds possibly observed in the input image,
wherein the cloud spectrum selection unit selects at least one spectrum of the one or more clouds from the spectra in the cloud spectra memory.

12. The image processing device according to claim 7, further comprising:
a cloud spectrum extraction unit configured to extract at least one of the spectra of the one or more clouds present in the input image from the input image,
wherein the cloud spectrum selection unit selects at least one spectrum from cloud spectra, the cloud spectra being one of the spectra of the one or more clouds extracted.

13. The image processing device according to claim 1, further comprising:
a cloud spectra memory for storing a plurality of spectra of one or more clouds possibly observed in the input image,
wherein the cloud spectrum selection unit selects at least one spectrum of the one or more clouds from the spectra in the cloud spectra memory.

14. The image processing device according to claim 13, further comprising:
a cloud types counting unit configured to count number of the cloud spectra present in the input image,
wherein the cloud spectra extraction unit extracts at least one of the spectra of the one or more clouds present in the input image from the input image based on the number of the cloud spectra present in the input image, which is counted by the cloud types counting unit.

15. An image processing method for detection and correction of a cloud cover, comprising:
selecting at least one spectrum for each of pixels from spectra of one or more clouds present in an input image;
extracting spectra of one or more endmembers other than the one or more clouds from those of the input image;
deriving fractional abundances of the respective spectra of one or more endmembers and a selected spectrum of one of the one or more clouds for the each of pixels in the input image;
extracting at least one of the spectra of the one or more clouds present in the input image from the input image;
selecting at least one spectrum from cloud spectra, the cloud spectra being one of the spectra of the one or more clouds extracted; and
extracting the cloud spectra present in the input image by:
deriving a histogram of a GLCM mean image of the input image only for the probable cloud area,
detecting peaks in the histogram,
forming clusters of the one or more clouds present in the input image based on the peaks in the histogram of GLCM mean of the probable cloud area, and
deriving the spectra of the one or more clouds resent in the input image as a set of representative spectra, each of which is obtained from each of the clusters.

16. A non-transitory computer-readable storage medium which stores image processing program to cause a computer for detection and correction of a cloud cover, the program comprising:
selecting at least one spectrum for each of pixels from spectra of one or more clouds present in an input image;
extracting spectra of one or more endmembers other than the one or more clouds from those of the input image;
deriving fractional abundances of the respective spectra of one or more endmembers and a selected spectrum of one of the one or more clouds for the each of pixels in the input image;
extracting at least one of the spectra of the one or more clouds present in the input image from the input image;
selecting at least one spectrum from cloud spectra, the cloud spectra being one of the spectra of the one or more clouds extracted; and
extracting the cloud spectra present in the input image by:
deriving a histogram of a GLCM mean image of the input image only for the probable cloud area,
detecting peaks in the histogram,
forming clusters of the one or more clouds present in the input image based on the peaks in the histogram of GLCM mean of the probable cloud area, and
deriving the spectra of the one or more clouds resent in the input image as a set of representative spectra, each of which is obtained from each of the clusters.

* * * * *